United States Patent
Masuda et al.

(10) Patent No.: US 11,239,526 B2
(45) Date of Patent: Feb. 1, 2022

(54) ENERGY STORAGE APPARATUS

(71) Applicant: GS Yuasa International Ltd., Kyoto (JP)

(72) Inventors: Yoshihiro Masuda, Ritto (JP); Shinpei Ono, Kyoto (JP); Yasuyuki Iwashima, Kyoto (JP); Yo Hasegawa, Kyoto (JP); Yuki Matsuda, Ritto (JP); Shun Sasaki, Kyoto (JP); Minoru Watanabe, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 115 days.

(21) Appl. No.: 16/493,988

(22) PCT Filed: Mar. 12, 2018

(86) PCT No.: PCT/JP2018/009573
§ 371 (c)(1),
(2) Date: Sep. 13, 2019

(87) PCT Pub. No.: WO2018/168802
PCT Pub. Date: Sep. 20, 2018

(65) Prior Publication Data
US 2021/0126314 A1    Apr. 29, 2021

(30) Foreign Application Priority Data

Mar. 15, 2017  (JP) .............................. JP2017-050604
Mar. 15, 2017  (JP) .............................. JP2017-050607
(Continued)

(51) Int. Cl.
*H01M 50/20*    (2021.01)
*H01M 50/209*   (2021.01)
(Continued)

(52) U.S. Cl.
CPC ....... *H01M 50/209* (2021.01); *H01M 50/505* (2021.01); *H01M 50/51* (2021.01); *H01M 50/55* (2021.01); *H01M 2220/20* (2013.01)

(58) Field of Classification Search
CPC .. H01M 50/209; H01M 50/51; H01M 50/505; H01M 50/55; H01M 2220/20
See application file for complete search history.

(56) References Cited

U.S. PATENT DOCUMENTS 5,645,448  A  *  7/1997  Hill ...................... H01R 11/287
                                                              439/522
2009/0325042  A1    12/2009  Koetting et al.
(Continued)

FOREIGN PATENT DOCUMENTS

| CN | 105074959 A | 11/2015 |
| JP | 3016457 B2 | 3/2000 |

(Continued)

OTHER PUBLICATIONS

Machine Translation of the Written Opinion (no date).*
(Continued)

*Primary Examiner* — Amanda C. Walke
(74) *Attorney, Agent, or Firm* — McGinn IP Law Group, PLLC

(57) ABSTRACT

An energy storage apparatus includes an energy storage device, a first wiring electrically connected to the energy storage device, a harness plate holding the first wiring, and a first connector connected to the first wiring, the first connector being located at a central portion of the harness plate and capable of detachably attaching an external wiring.

20 Claims, 12 Drawing Sheets

(30) Foreign Application Priority Data

Feb. 27, 2018 (JP) .............................. JP2018-033787
Feb. 28, 2018 (JP) .............................. JP2018-035323

(51) Int. Cl.
*H01M 50/51* (2021.01)
*H01M 50/505* (2021.01)
*H01M 50/55* (2021.01)

(56) References Cited

U.S. PATENT DOCUMENTS

| | | |
|---|---|---|
| 2010/0224403 A1 | 9/2010 | Kosaki et al. |
| 2013/0101883 A1 | 4/2013 | Zhao |
| 2013/0112551 A1 | 5/2013 | Fritz |
| 2013/0273412 A1 | 10/2013 | Okada et al. |
| 2013/0288530 A1* | 10/2013 | Zhao ................... H01M 10/486 439/627 |
| 2013/0302662 A1 | 11/2013 | Ogasawara et al. |
| 2013/0306353 A1 | 11/2013 | Zhao |
| 2013/0309537 A1 | 11/2013 | Zhao |
| 2013/0330584 A1 | 12/2013 | Lee et al. |
| 2014/0310341 A1* | 10/2014 | Watanabe ............... H04L 63/08 709/203 |
| 2015/0111073 A1 | 4/2015 | Deriha et al. |
| 2016/0021772 A1 | 1/2016 | Nakayama et al. |
| 2016/0178702 A1 | 6/2016 | Inoue |
| 2018/0309113 A1 | 10/2018 | Nakayama et al. |
| 2019/0044123 A1* | 2/2019 | Nishimura ............ H01M 50/20 |
| 2020/0035979 A1* | 1/2020 | Yamamoto ............... H01G 2/04 |

FOREIGN PATENT DOCUMENTS

| | | |
|---|---|---|
| JP | 3503873 B2 | 3/2004 |
| JP | 2010-211962 A | 9/2010 |
| JP | 2012-054025 A | 3/2012 |
| JP | WO 2012/057323 A1 | 5/2012 |
| JP | 2012-230813 A | 11/2012 |
| JP | 5425899 B2 | 2/2014 |
| JP | 5613332 B2 | 10/2014 |
| JP | 2014-532958 A | 12/2014 |
| JP | 5720530 B2 | 5/2015 |
| JP | 2015-520934 A | 7/2015 |
| JP | 2015-187915 A | 10/2015 |
| JP | 2016-018741 A | 2/2016 |
| JP | 2016-051511 A | 4/2016 |
| JP | 5912171 B2 | 4/2016 |
| JP | 2016-100247 A | 5/2016 |
| JP | 2016-103397 A | 6/2016 |
| JP | 2016-115647 A | 6/2016 |
| JP | 2016-143584 A | 8/2016 |
| JP | 6044505 B2 | 12/2016 |
| JP | 2017-123298 A | 7/2017 |
| WO | WO 2014/155719 A1 | 10/2014 |
| WO | WO 2016/030144 A1 | 3/2016 |

OTHER PUBLICATIONS

Machine translation of WO 2014/155719 (no date).*
International Search Report (ISR) (PCT Form PCT/ISA/210), in PCT/JP2018/009573, dated Apr. 24, 2018.

* cited by examiner

US 11,239,526 B2

ENERGY STORAGE APPARATUS

TECHNICAL FIELD

The present invention relates to an energy storage apparatus including an energy storage device to which an external conductive member is electrically connected.

BACKGROUND ART

Conventionally, there is a monitoring apparatus that monitors a state of the energy storage apparatus including at least one energy storage device. For example, Patent Document 1 discloses a battery monitoring apparatus including a high-voltage-side connector electrically connected to a battery and a low-voltage-side connector connected to a higher microcontroller. In the battery monitoring apparatus, the high-voltage-side connector and the low-voltage-side connector are disposed on sides opposed to each other in a housing in planar view.

PRIOR ART DOCUMENT

Patent Document

Patent Document 1: JP-A-2016-115647

SUMMARY OF THE INVENTION

Problems to be Solved by the Invention

For example, when the external device such as the battery monitoring apparatus is connected to the energy storage apparatus including the energy storage device, an external conductive member such as an external wiring is electrically connected to the energy storage device, and high safety is required for the energy storage device.

The present invention has been made in view of the above-described problems, and an object of the present invention is to provide a high-safety energy storage apparatus.

Means for Solving the Problems

In order to achieve the above object, an energy storage apparatus according to one aspect of the present invention includes: an energy storage device; a first wiring electrically connected to the energy storage device; a wiring holding member holding the first wiring; and a first connector connected to the first wiring, the first connector being located in a central portion of the wiring holding member and capable of detachably attaching an external wiring.

Advantages of the Invention

The present invention can provide the high-safety energy storage apparatus.

MODE FOR CARRYING OUT THE INVENTION

Figure 1:
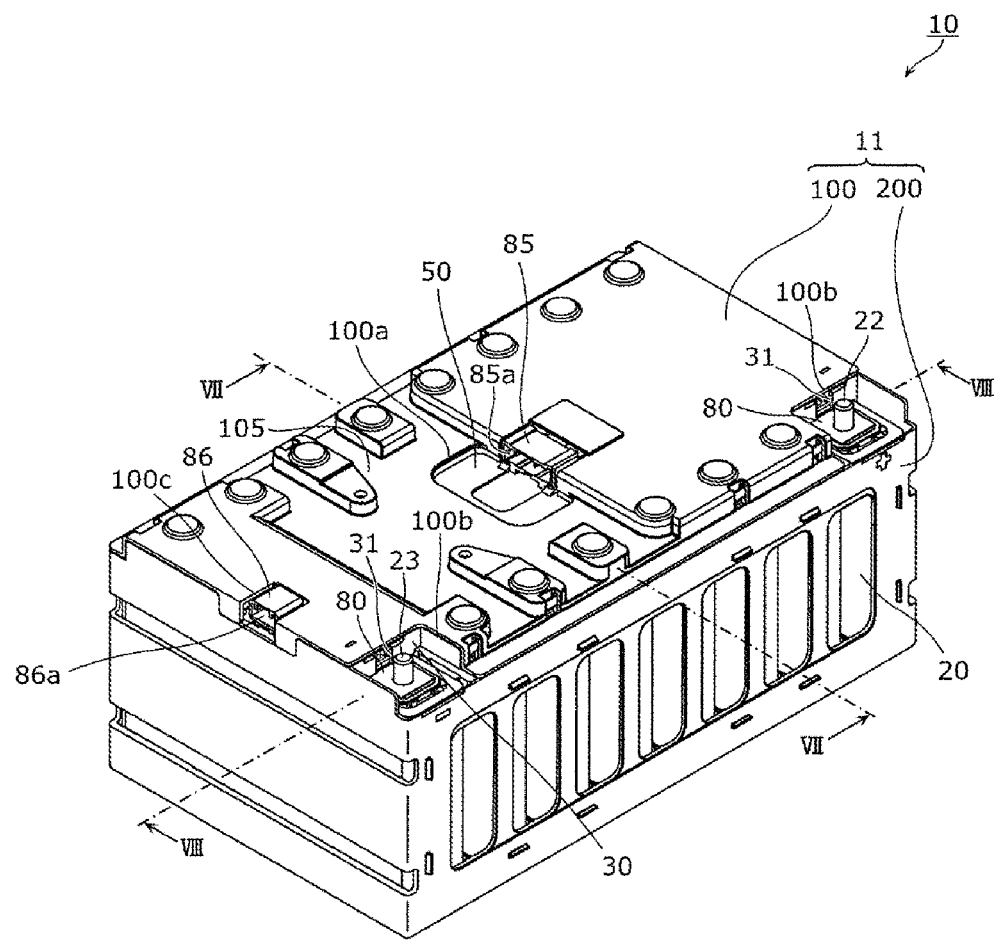
FIG. 1 is a perspective view illustrating an appearance of an energy storage apparatus according to an embodiment.

For example, a connector connecting with an external wiring is also provided in the energy storage apparatus connected to the external device such as the battery monitoring apparatus disclosed in Patent Document 1. Because the connector is an electric connection point between the energy storage apparatus and the external device, a device for protecting the energy storage apparatus from an impact or the like is required when the energy storage apparatus is mounted on a moving body such as an electric vehicle (EV) in order to drive or start the moving body. In particular, high safety is required for a connector electrically connected to an energy storage device of the energy storage apparatus.

For this reason, the connector is susceptible to the impact when the connector electrically connected to the energy storage device is disposed at an end of the housing (an outer case of the energy storage apparatus) as in the conventional battery monitoring device.

According to one aspect of the present invention, an energy storage apparatus includes: an energy storage device; a first wiring electrically connected to the energy storage device; a wiring holding member holding the first wiring; and a first connector connected to the first wiring, the first connector being located in a central portion of the wiring holding member and capable of detachably attaching an external wiring.

With this configuration, the energy storage apparatus includes the first wiring electrically connected to the energy storage device with the first wiring held by the wiring holding member. For this reason, for example, when the energy storage apparatus is manufactured (assembled), the first wiring can be incorporated into the energy storage apparatus while held by the wiring holding member. Consequently, entrapment between members of the first wiring and the like is hardly generated. For example, a possibility of generating a defect such as disconnection of the first wiring is reduced as compared with the case that a freedom degree of movement of the first wiring is high. Additionally, the first connector is located in the central portion of the wiring holding member, so that a possibility of damage of the first connector that is in an energized state with the energy storage device is reduced when the moving body on which the energy storage apparatus is mounted generates a crush or the like. That is, generation of an unsafe event such as an external short circuit due to the damage to the first connector is prevented. As described above, the energy storage apparatus according to one aspect is a high-safety energy storage apparatus including a connector to which the external wiring can detachably be attached.

The energy storage apparatus may further include: a second wiring that is a wiring for a voltage lower than that of the first wiring, and is held by the wiring holding member; and a second connector connected to the second wiring and located at an end of the wiring holding member.

With this configuration, in the energy storage apparatus in which the possibility of the damage to the first connector for high voltage is reduced during the generation of the crush, ease of the attachment and the detachment of the external wiring to and from the second connector for low voltage is ensured, the second connector for low voltage being located at the end of the wiring holding member.

At this point, the connector can generate the damage when excessive external force is applied to the connector due to collision of the moving body on which the energy storage apparatus is mounted with an object or the forced attachment and detachment of the external wiring to and from the connector. When the connector is damaged, a state of the energy storage apparatus cannot correctly be checked, or a safety problem such as the generation of the external short circuit may be generated.

In the energy storage apparatus, the first connector to which a relatively high voltage is applied reduces the possibility of the damage in an emergency such as the crush. In the energy storage apparatus, the second connector to which a relatively low voltage is applied reduces the possibility of the damage in attaching and detaching the external wiring (at least one of the attachment and the detachment of the external wiring). Consequently, the energy storage apparatus having the highly safety is obtained.

In the energy storage apparatus, the wiring holding member may include a restricting portion that restricts the first wiring and the second wiring to positions arranged in a first region in a direction intersecting with an arrangement direction of the energy storage device and the wiring holding member.

With this configuration, for example, when the wiring holding member is disposed on the energy storage device, an increase in size of a vertical direction is prevented because the first wiring and the second wiring do not vertically overlap each other at least in the first region. The possibility of the disconnection of the first wiring or the second wiring due to pressing force from the cover is reduced when the cover or the like covering the wiring holding member is disposed.

The energy storage apparatus may further include an outer case covering the wiring holding member from an opposite side to the energy storage device. A low surface portion forming an outer surface closer to the wiring holding member than other portions may be formed in the outer case at a position opposed to the first region.

With this configuration, the external wiring or an electric device such as a control board can be disposed using a space formed by, for example, the low surface portion that is the recessed portion in the outer case. That is, the space around the energy storage apparatus is effectively used while the safety of the energy storage apparatus is secured.

In the energy storage apparatus, the first wiring and the second wiring may be disposed while detouring around a second region on a connection port side of the first connector.

With this configuration, the ease of the attachment and the detachment of the external wiring to and from the first connector disposed in the central portion of the wiring holding member is secured. For this reason, the possibility of the damage to the first connector in attaching and detaching the external wiring to and from the first connector is reduced.

In the energy storage apparatus, the wiring holding member may include a wall standing along at least a part of a periphery of the second region.

With this configuration, existence of the wall can forcedly position the first wiring and the second wiring outside the second region during or after the disposition of the first wiring and the second wiring in the wiring holding member. For this reason, for example, the ease of the attachment and the detachment of the external wiring to and from the first connector is further ensured.

Conventionally, an energy storage apparatus having a configuration in which a conductive member such as an external wiring is connected to an energy storage unit including the energy storage device and the outer case is widely known. For example, Patent Document 2 (JP-A-2016-51511) discloses a battery pack (energy storage apparatus) having a configuration in which a harness (conductive member) is connected to a battery module (energy storage unit) including a battery cell (energy storage device) and a cover member (outer case). The harness is disposed between standing portions provided at both ends of the cover member.

However, in the conventional energy storage apparatus, a space is provided to dispose the conductive member connected to the energy storage unit, so that space saving cannot be achieved. That is, in the conventional energy storage apparatus, because the standing portions are provided at both the ends of the cover member in order to dispose the harness as the conductive member, a height of the standing portion is added to a height of the cover member to increase the height of the cover member, and the space saving cannot be achieved. For this reason, there is a need for the energy storage apparatus capable of achieving the space saving.

The energy storage apparatus according to one aspect of the present invention may further include: a first energy storage unit including the energy storage device, a bus bar connected to an electrode terminal of the energy storage device, and an outer case; and a first conductive member that is the external wiring connected to the first energy storage unit. The outer case may include: a protrusion that is disposed opposite to the bus bar, an outer surface of the protrusion being protruded; and a recess disposed adjacent to the protrusion, an outer surface of the recess being recessed, and the first conductive member may be disposed in the recess.

With this configuration, in the energy storage apparatus, the outer case of the first energy storage unit includes the protrusion opposed to the bus bar and the recess adjacent to the protrusion, and the first conductive member connected to the first energy storage unit is disposed in the recess. As described above, since the first conductive member is disposed in the recess of the outer case, so that contact of the first conductive member with another conductive member or the entrapment between the outer case and other members can be prevented. Consequently, the first conductive member is energized with another conductive member, and the damage to the first conductive member and the outer case is prevented, so that the safety can be secured.

In the first energy storage unit, because the portion in which the bus bar is disposed protrudes outward, when the outer case is formed along the bus bar, the protrusion is formed opposite to the bus bar of the outer case, and the recess is formed adjacent to the protrusion. Consequently, by disposing the conductive member such as an external wiring connected to the first energy storage unit in the recess, the space in the recess can effectively be used to achieve the space saving.

The protrusion may include a first protrusion that is disposed opposite to the electrode terminal of the energy storage device.

With this configuration, in the outer case of the first energy storage unit, the protrusion disposed opposite to the bus bar includes the first protrusion disposed opposite to the electrode terminal of the energy storage device. That is, because the electrode terminal of the energy storage device protrudes outward, when the outer case is formed along the electrode terminal, the first protrusion is formed at the position opposed to the electrode terminal of the outer case, and the recess is formed at a position adjacent to the first protrusion. Consequently, by disposing the conductive member such as an external wiring connected to the first energy storage unit in the recess, the space in the recess can effectively be used to secure the safety, the space saving can be achieved.

The recess may include a first recess disposed between two of the first protrusions that are disposed opposite to electrode terminals of two different energy storage devices.

With this configuration, the first recess is formed between the two first protrusions opposed to the electrode terminals of the two different energy storage devices in the outer case of the first energy storage unit. That is, the first recess is formed in the outer surface of the outer case so as to be opposed to a gap between the electrode terminals of the different energy storage devices, and the conductive member is disposed in the first recess. Consequently, the gap between the electrode terminals of the different energy storage devices can effectively be used to secure the safety, the space saving can be achieved.

The recess may include a second recess disposed between two of the first protrusions that are disposed opposite to two electrode terminals of an identical energy storage device.

With this configuration, in the outer case of the first energy storage unit, the second recess is formed between the two first protrusions opposed to the two electrode terminals of the identical energy storage device. That is, the second recess is formed in the outer surface of the outer case so as to be opposed to the gap between the electrode terminals of the identical energy storage device, and the conductive member is disposed in the second recess. Consequently, the gap between the electrode terminals of the identical energy storage device can effectively be used to secure the safety, the space saving can be achieved.

The bus bar may include: two terminal connection portions connected to the electrode terminals of the two different energy storage devices; and a middle portion disposed between the two terminal connection portions, and the protrusion may include a second protrusion that is disposed opposite to the middle portion.

With this configuration, the outer case of the first energy storage unit includes the second protrusion that is disposed opposite to the middle portion of the bus bar. That is, in the first energy storage unit, because generally the middle portion of the bus bar protrudes outward, when the outer case is formed along the middle portion, the second protrusion is formed at the position opposed to the middle portion of the outer case, and the recess is formed at a position adjacent to the second protrusion. Consequently, by disposing the conductive member such as an external wiring connected to the first energy storage unit in the recess, the space in the recess can effectively be used to secure the safety, the space saving can be achieved.

The recess may include a third recess that is disposed opposite to at least one of the two terminal connection portions, the third recess being recessed relative to the second protrusion.

With this configuration, the outer case of the first energy storage unit includes the third recess that is disposed opposite to the terminal connection portion of the bus bar. That is, in the first energy storage unit, because generally the terminal connection portion of the bus bar is recessed relative to the middle portion, the third recess opposed to the terminal connection portion is formed when the outer case is formed along the bus bar. Consequently, by disposing the conductive member such as an external wiring connected to the first energy storage unit in the third recess, the space in the third recess can effectively be used to secure the safety, the space saving can be achieved.

The first conductive member may be an external wiring connected to the first energy storage unit, and the first energy storage unit may further include a first connector to which the external wiring is connected, and a connection port to which the external wiring of the first connector is connected may be disposed so as to be open toward a direction along a bottom surface of the recess and inward the recess.

With this configuration, the first energy storage unit includes the first connector to which the external wiring as the first conductive member is connected, and the connection port of the first connector is disposed so as to be open toward the direction along the bottom surface of the recess of the outer case and inward the recess. The connection port of the first connector is open toward the recess of the outer case, so that the external wiring can be disposed in the recess and connected to the first connector. Consequently, the recess is effectively used as a space for connecting the external wiring to the first connector, so that the safety can be secured to achieve the space saving.

The first connector may be disposed in a central portion of the outer case.

With this configuration, by disposing the first connector in the central portion of the outer case, the first connector and the external wiring connected to the first connector can be protected from the external impact and the like. That is, because the protrusion is disposed outside the first connector by disposing the first connector in the recess located in the central portion of the outer case, the protrusion prevents the first connector and the external wiring from interfering with an external member, and the first connector and the external wiring can effectively be protected. For example, when the external wiring is electrically connected to the electrode terminal of the energy storage device, the external wirings may come in contact with each other to generate a short circuit, so that the short circuit can be protected. As described above, by disposing the first connector in the central portion of the outer case, the first connector and the external wiring can effectively be protected to secure the safety while the space saving is achieved.

The outer case may include a holder holding the first conductive member in the recess.

With this configuration, because the outer case includes the holder holding the first conductive member in the recess, the conductive member is held by the recess of the outer case, and the conductive member can be prevented from floating from the recess or releasing from the outer case. Thus, when the first conductive member is held in the recess so as not to protrude from the recess, the safety can be secured, and the space saving can be achieved.

The energy storage apparatus may further include: a second energy storage unit different from the first energy storage unit; and a second conductive member connected to the second energy storage unit. The second conductive member may be disposed in the recess of the first energy storage unit.

With this configuration, the energy storage apparatus further includes the second energy storage unit and the second conductive member connected to the second energy storage unit, and the second conductive member is disposed in the recess of the outer case of the first energy storage unit. Thus, the space in the recess of the outer case of the first energy storage unit is effectively used as a space where the second conductive member connected to the second energy storage unit is disposed, so that the safety can be secured, and the space saving can be achieved.

The first energy storage unit may further include a wiring holding member in which an internal wiring is disposed between the energy storage device and the outer case, and the outer case may include a rib opposed to the wiring holding member in a portion where the recess is not formed.

With this configuration, in the outer case, the rib opposed to the wiring holding member is provided in the portion where the recess is not formed. That is, because the gap is generated between the wiring holding member and the portion where the recess of the outer case is not formed, the rib is disposed between the wiring holding member and the portion where the recess of the outer case is not formed. As described above, even if the recess is formed in the outer case in order to dispose the conductive member, the gap with the wiring holding member can be filled with the rib. For this reason, the wiring holding member, the internal wiring on the wiring holding member, the connector, and the like can be prevented from floating.

The first energy storage unit may further include a thermistor, and the rib may be disposed at a position closing an opening adjacent to the thermistor.

With this configuration, because the rib of the outer case is disposed at a position closing the opening adjacent to the thermistor, the opening near the thermistor is closed using the rib of the outer case to prevent the thermistor from being affected by an external temperature. Thus, the rib of the outer case that fills the gap with the wiring holding member can be used also as the rib that closes the opening near the thermistor.

The present invention can be implemented as not only the energy storage apparatus, but also the wiring holding member or the outer case of the energy storage apparatus.

Hereinafter, an energy storage apparatus according to an embodiment of the present invention will be described with reference to the drawings. The embodiment described below illustrates a comprehensive or specific example. Numerical values, shapes, materials, components, dispositions of the components, connection forms of the components, and the like described in the following embodiment are merely examples, and are not intended to limit the present invention. Among the components of the following embodiment, the component that is not described in the independent claim indicating the highest concept is described as an optional component. In each of the drawings, dimensions and the like are not strictly illustrated.

In the following description and drawings, an arrangement direction of electrode terminals in one energy storage device, a direction opposed to a short side surface of a case of the energy storage device, or a direction opposed to a long side surface of an outer case of the energy storage apparatus is defined as an X-axis direction. An arrangement direction of a plurality of energy storage devices, a direction opposed to a long side surface of the case of the energy storage device, a thickness direction of the case, or a direction opposed to the short side surface of the outer case of the energy storage apparatus is defined as a Y-axis direction. An arrangement direction of an outer case body, the energy storage device, an inner lid, the harness plate, and a lid of the energy storage apparatus, an alignment direction of a case body and the lid in the energy storage device, or a vertical direction is defined as a Z-axis direction. The X-axis direction, the Y-axis direction, and the Z-axis direction are directions intersecting with one another (orthogonal to one another in the embodiment). Although it may be considered that the Z-axis direction is not in the vertical direction depending on a mode of use, hereinafter the Z-axis direction is described as the vertical direction for convenience. In the following description, for example, a positive side in the X-axis direction indicates an arrow direction side of the X axis, and a negative side in the X-axis direction indicates an opposite side to the positive side in the X-axis direction. The same applies to the Y-axis direction and the Z-axis direction.

Embodiment

Figure 2:
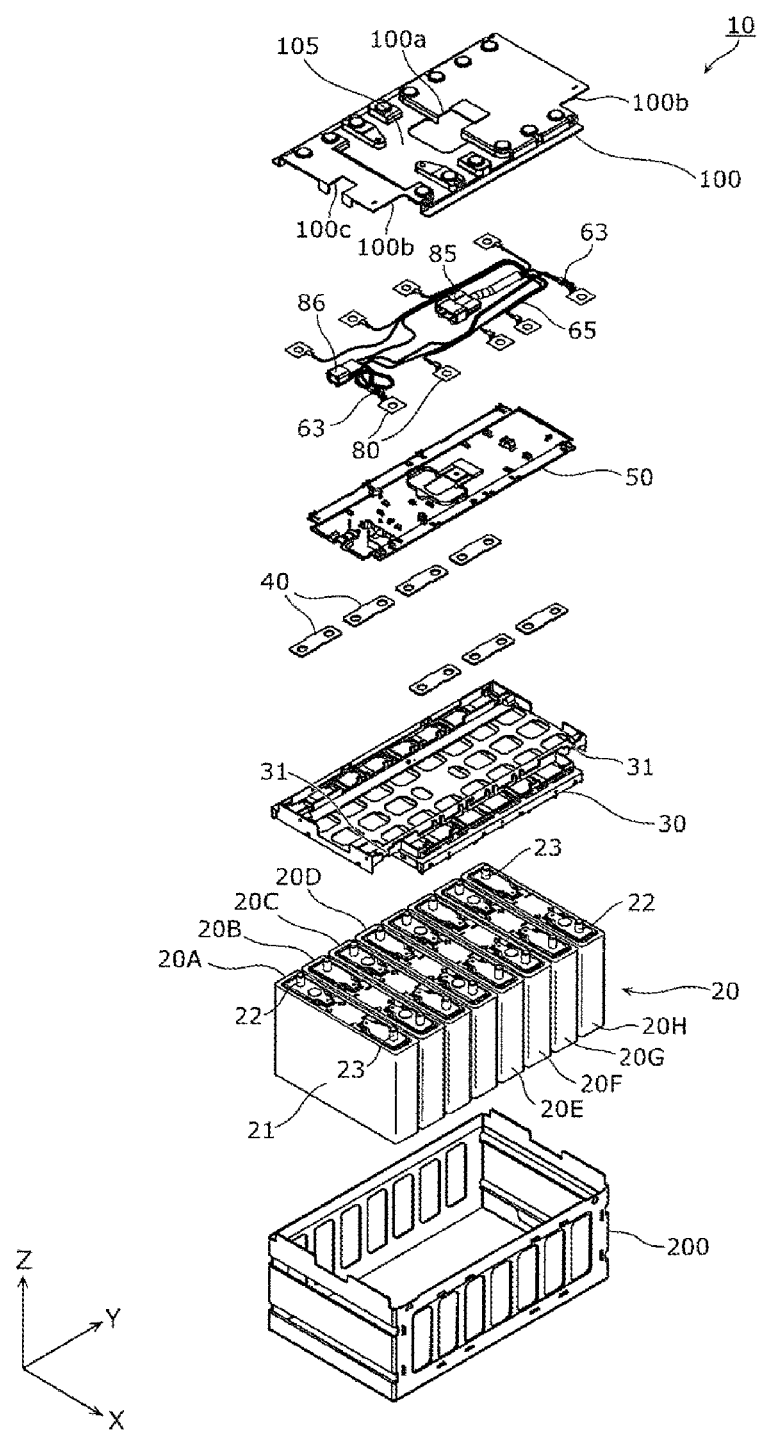
FIG. 2 is a first exploded perspective view illustrating each component when the energy storage apparatus according to the embodiment is disassembled.
Figure 3:
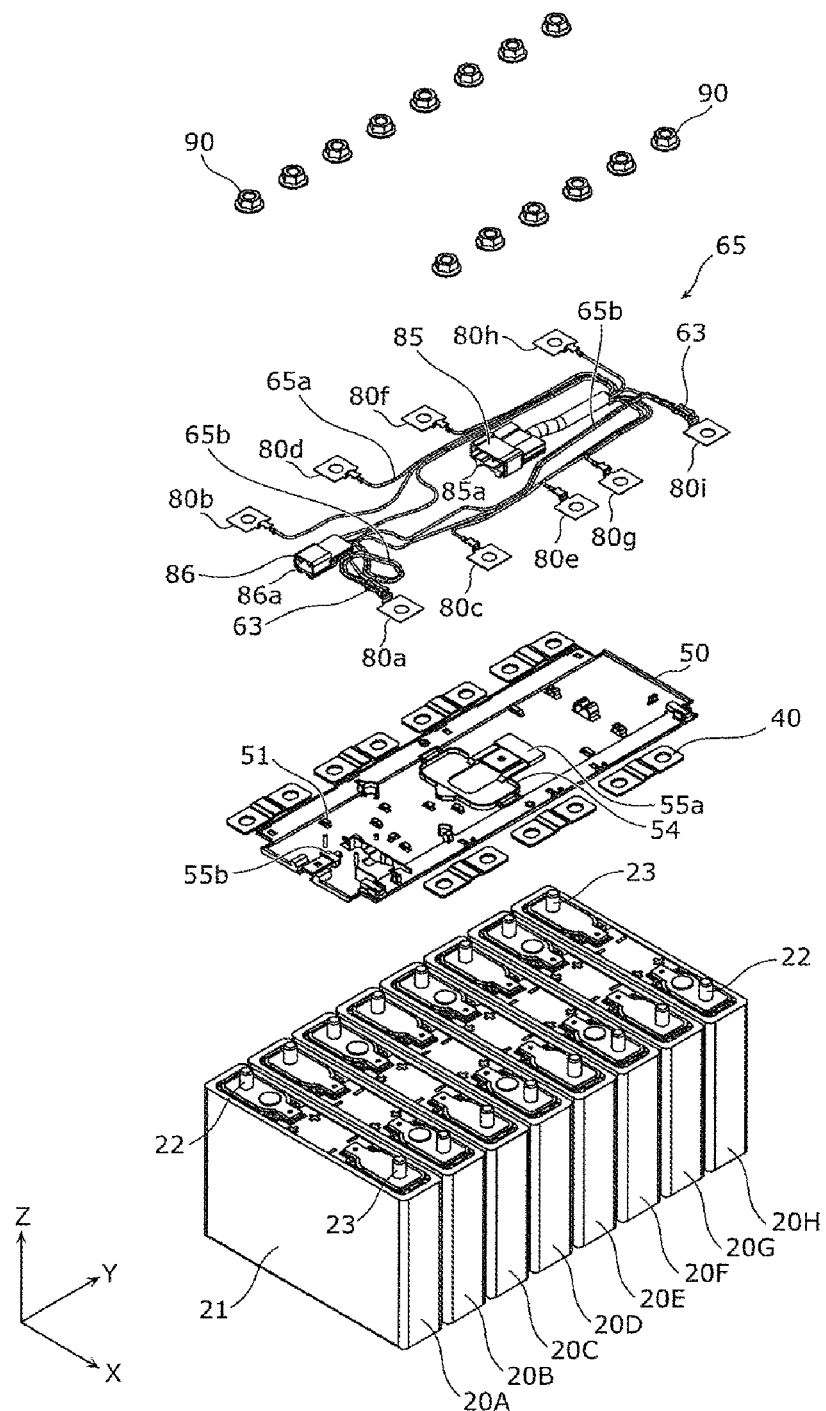
FIG. 3 is a second exploded perspective view illustrating each component when the energy storage apparatus according to the embodiment is disassembled.

A configuration of an energy storage apparatus 10 according to the embodiment will be described. FIG. 1 is a perspective view illustrating an appearance of the energy storage apparatus 10 according to the embodiment. FIG. 2 is a first exploded perspective view illustrating each component when the energy storage apparatus 10 according to the embodiment is disassembled. FIG. 3 is a second exploded perspective view illustrating each component when the energy storage apparatus 10 according to the embodiment is disassembled. In order to clearly illustrate a relationship between a harness plate 50 and members fixed to the harness plate 50, an outer case 11 and an inner lid 30 are not illustrated in FIG. 3.

The energy storage apparatus 10 is an apparatus that can be charged from the outside and discharge electricity to the outside. The energy storage apparatus 10 may be a battery module used for a power storage application, a power supply application, and the like. Specifically, the energy storage apparatus 10 may be used as a battery for driving or starting an engine of a moving body such as automobiles such as an electric vehicle (EV), a hybrid electric vehicle (HEV) and a plug-in hybrid electric vehicle (PHEV), motorcycles, watercrafts, snowmobiles, agricultural machines, and construction machines.

As illustrated in FIGS. 1 and 2, the energy storage apparatus 10 includes the outer case 11 including a lid 100 and an outer case main body 200, a plurality of energy storage devices 20 accommodated in the outer case 11, the inner lids 30, a plurality of bus bars 40, the harness plate 50, and an internal wiring 65.

The outer case 11 is a rectangular (box-shaped) case (module case) constituting an outer case of the energy storage apparatus 10. That is, the outer case 11 is disposed outside the energy storage device 20, the harness plate 50, and the like, and the outer case 11 protects the energy storage device 20 and the like from impact and the like while the energy storage device 20 and the like are disposed at predetermined positions. The outer case 11 may be made of an insulating material such as polycarbonate (PC), polypropylene (PP), polyethylene (PE), a polyphenylene sulfide resin (PPS), polybutylene terephthalate (PBT), and an ABS resin. This enables the outer case 11 to prevent the energy storage device 20 and the like from contacting with a metal member and the like.

The outer case 11 has the flat rectangular lid 100 constituting a lid (outer lid) of the outer case 11 and the outer case main body 200 constituting a main body of the outer case 11. The lid 100 is an example of an outer case (cover member) that covers the harness plate 50 from the opposite side to the energy storage device 20. The outer case main body 200 is a bottomed rectangular cylindrical housing in which an opening is formed. That is, the lid 100 is disposed to close the opening of the outer case main body 200. The lid 100 and the outer case main body 200 may be constructed with a member made of the same material, or constructed with members made of different materials.

An opening 100a that is a rectangular through-hole is formed in a central portion of the lid 100, and openings 100b that are a rectangular notch are formed on corners on the positive side in the X-axis direction of the lid 100 and both sides in the Y-axis direction of the lid 100. An opening 100c that is a rectangular notch is formed in the center in the X-axis direction of the lid 100 and on the negative side in the Y-axis direction of the lid 100. A low surface portion 105 constituting an outer surface closer to the harness plate 50 than other portions is formed in the lid 100. The detailed description of a configuration of the lid 100 will be described later.

The energy storage device 20 is a secondary battery (battery cell) capable of being charged and discharging electricity, more specifically, a nonaqueous electrolyte secondary battery such as a lithium ion secondary battery. The energy storage device 20 has a flat rectangular parallelepiped (prismatic) shape. In the embodiment, eight storage devices 20 (energy storage devices 20A to 20H) are arranged in the Y-axis direction. The shape of the energy storage device 20 and the number of energy storage devices 20 to be arranged are not limited. The energy storage device 20 is not limited to the nonaqueous electrolyte secondary battery, but may be a secondary battery except for the nonaqueous electrolyte secondary battery, a capacitor, or a primary battery that can use stored electricity even if a user does not charge the battery. The energy storage device 20 may be a battery in which a solid electrolyte is used.

Specifically, the energy storage device 20 includes a metal case 21, and a positive electrode terminal 22 and a negative electrode terminal 23 that are metal electrode terminals are provided in a lid portion of the case 21. A liquid injection portion that injects an electrolyte solution, a gas release valve that discharges gas to release a pressure during pressure rise in the case 21, and the like may be provided in the lid portion of the case 21. In the case 21, an electrode assembly (also referred to as an energy storage element or a power generating element), a current collector (a positive electrode current collector and a negative electrode current collector), and the like are disposed, and the electrolyte solution (nonaqueous electrolyte) or the like is enclosed. However, detailed explanation is omitted.

In the embodiment, the positive electrode terminal 22 and the negative electrode terminal 23 are a bolt terminal including a bolt in which a thread is formed, the positive electrode terminal 22 and the negative electrode terminal 23 being disposed so as to protrude from the lid portion of the case 21 toward the lid 100 (upward, namely, toward the positive side in the Z-axis direction). The negative electrode terminal 23 of the energy storage device 20A and the positive electrode terminal 22 of the energy storage device 20H, which are the outermost electrode terminal of the plurality of energy storage devices 20, are disposed while exposed from the opening 100b formed in the corners on the positive side in the X-axis direction of the lid 100 and both sides in the Y-axis direction. By connecting the outermost electrode terminal to an external terminal (not illustrated) or causing the outermost electrode terminal to function as an external terminal, the energy storage apparatus 10 can be charged from the outside, and discharge electricity to the outside.

The inner lid 30 is a flat rectangular member constituting an inner lid of the outer case 11, and has a function of reinforcing the outer case main body 200. The inner lid 30 is disposed between the harness plate 50 and the energy storage device 20, and holds the harness plate 50 from below while holding the energy storage device 20 from above. The inner lid 30 may be made of an insulating material such as PC, PP, PE, PPS, PBT, and ABS resins. An opening 31 is formed at the corner on the positive side in the X-axis direction of the inner lid 30 and on both sides in the Y-axis direction. A thermistor 63 and a detection terminal 80 (to be described later) are disposed in the opening 31.

The bus bar 40 is a rectangular plate-shaped member disposed on the plurality of energy storage devices 20 (on the inner lid 30) and electrically connecting the electrode terminals of the plurality of energy storage devices 20 to each other. The bus bar 40 may be constructed with a conductive member made of metal such as copper, a copper alloy, aluminum, and an aluminum alloy. Specifically, a through-hole is made in the bus bar 40, the bolt of the electrode terminal of the energy storage device 20 is inserted into the through-hole, and a nut 90 (see FIG. 3) is fastened to the bolt, whereby the bus bar 40 and the electrode terminal are connected to each other. In the embodiment, the positive electrode terminal 22 of one of the energy storage devices 20 adjacent to each other and the negative electrode terminal 23 of the other energy storage device 20 are connected to each other by the bus bar 40. Consequently, eight energy storage devices 20 are connected in series. The connection state of the energy storage device 20 is not limited to the above connection, but series connection and parallel connection may be combined in any way.

In the embodiment, the detection terminal 80 that is a terminal for voltage detection is disposed in contact with each of the plurality of bus bars 40. Specifically, the detection terminal 80 is disposed on the top surface of the bus bar 40, and the bus bar 40 and the detection terminal 80 are tightened together by the nut 90. That is, the detection terminal 80 is fixed in contact with the bus bar 40 by the nut 90 that fixes the bus bar 40 to the electrode terminal of the energy storage device 20.

Specifically, as described above, the detection terminal 80 is disposed at a position corresponding to the negative electrode terminal 23 of the energy storage device 20A and the positive electrode terminal 22 of the energy storage device 20H that are the outermost electrode terminals of the plurality of energy storage devices 20. The detection terminal 80 is a member connecting the outermost electrode terminal and the thermistor 63. That is, the through-hole is made in the detection terminal 80, the bolt of the outermost electrode terminal is inserted into the through-hole, and the thermistor 63 is connected to a leading end of the detection terminal 80, which allows the temperature of the electrode terminal to be measured. The leading end of the detection terminal 80 is inserted into the opening 31 of the inner lid 30, and the portion that excludes the leading end and is connected to the electrode terminal is exposed from the opening 100*b* formed at the corner of the lid 100.

The thermistor 63 is disposed in the detection terminal 80 disposed in each of the negative electrode terminal 23 of the energy storage device 20A and the positive electrode terminal 22 of the energy storage device 20H that are the outermost electrode terminals of the plurality of energy storage devices 20. That is, the thermistor 63 measures the temperatures of the positive electrode terminal 22 of the energy storage device 20H that is a total positive terminal of the energy storage unit constructed with energy storage devices 20A to 20H connected in series and the negative electrode terminal 23 of the energy storage device 20A that is a total negative terminal of the energy storage device unit The harness plate 50 is an example of the wiring holding member, and is a flat rectangular member on which electrical components such as the internal wiring 65, a first connector 85, and a second connector 86 are disposed. The harness plate 50 is disposed between the energy storage device 20 and the lid 100.

The harness plate 50 may be made of an insulating material such as PC, PP, PE, PPS, PBT, and ABS resins. That is, the harness plate 50 is placed on the inner lid 30, holds the internal wiring 65, the first connector 85, the second connector 86, and the like, and insulates the internal wiring 65 and the like from other members, and restricts the positions of the internal wiring 65 and the like.

The internal wiring 65 is an internal harness including wirings, such as a first wiring 65*a* electrically connecting each electrode terminal of the energy storage device 20 to the first connector 85 and a second wiring 65*b* electrically connecting two thermistors 63 to the second connector 86, which perform various kinds of connection. The internal wiring 65 is attached to the harness plate 50. For example, the internal wiring 65 is hooked in a first restricting portion 51 that is a claw-shaped member provided in the harness plate 50, whereby the internal wiring 65 is held by the harness plate 50. An attachment structure of the internal wiring 65 to the harness plate 50 will be described in detail later with reference to FIG. 5.

The first connector 85 is a high-voltage connector connected to each electrode terminal of the energy storage device 20. The first connector 85 is attached to the harness plate 50, and exposed from the opening 100*a* formed in the central portion of the lid 100. The second connector 86 is a low-voltage connector connected to the thermistor 63. The second connector 86 is attached to the harness plate 50, and exposed from the opening 100*c* formed at the center in the X-axis direction of the lid 100 and on the negative side in the Y-axis direction. Consequently, the first connector 85 is disposed in the central portion of the outer case 11, and the second connector 86 is disposed at the end of the outer case 11. Connection ports 85*a*, 86*a* of the first connector 85 and the second connector 86 are disposed to be open outward, and the external wiring is connected to the connection ports 85*a*, 86*a*.

In the embodiment, the first connector 85 is a connector including a plurality of pins in the connection port 85*a*, and the second connector 86 is a connector including a plurality of pins in the connection port 86*a*. That is, a connector including a plurality of pin holes provided at the end of the external wiring is inserted in each of the connection port 85*a* of the first connector 85 and the connection port 86*a* of the second connector 86.

The first connector 85 is attached to the harness plate 50 while a rear end of the first connector 85 is supported by a first connector support 55*a* of the harness plate 50. The second connector 86 is attached to the harness plate 50 while the rear end of the second connector 86 is supported by a second connector support 55*b* of the harness plate 50. In each of the first connector 85 and the second connector 86, the rear end on the opposite side to the connection port (85*a* or 86*a*) is supported by the connector support (55*a* or 55*b*), thereby preventing the first connector 85 and the second connector 86 from floating.

The thermistor 63 is a temperature sensor that is attached to the harness plate 50, is connected to the electrode terminal of the energy storage device 20 through the detection terminal 80, and measures the temperature of the electrode terminal (that is, measures the temperature of the energy storage device 20). In the embodiment, the two thermistors 63 are disposed. However, the number of thermistors 63 is not particularly limited.

Figure 4A:
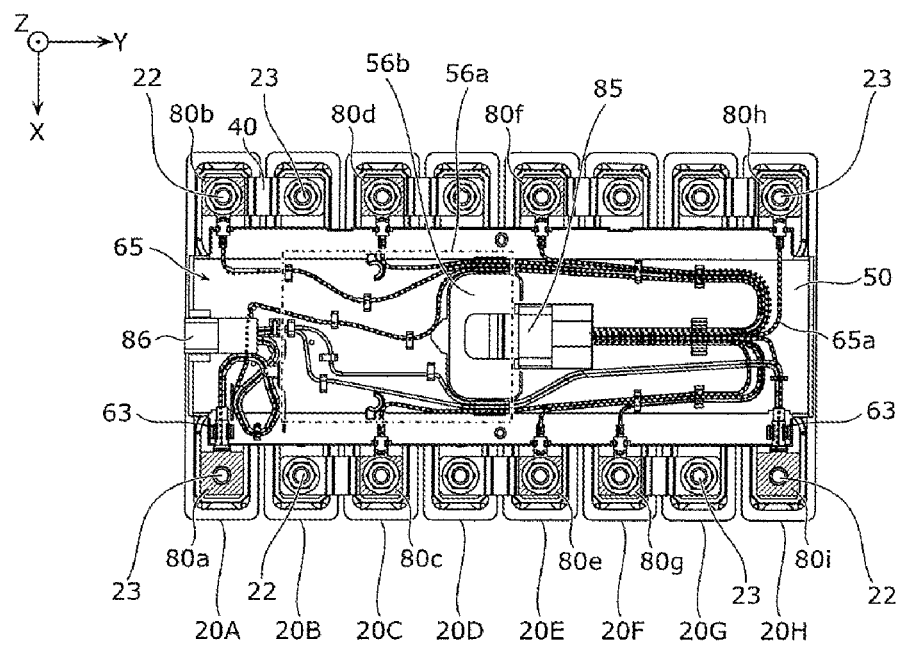
FIG. 4A is a plan view illustrating a layout of a first wiring according to the embodiment.
Figure 4B:
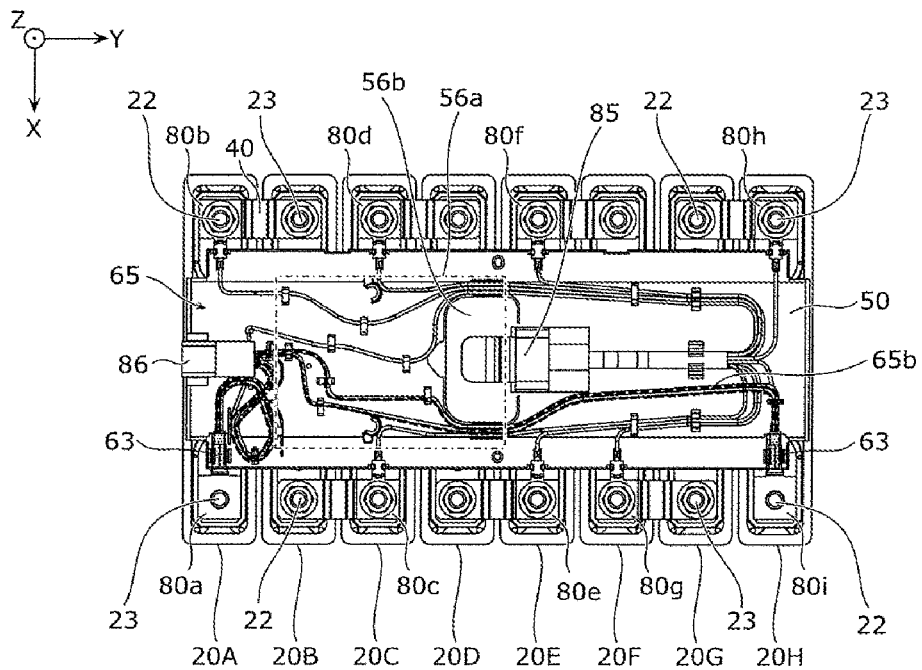
FIG. 4B is a plan view illustrating a layout of a second wiring according to the embodiment.

The first wiring 65*a* and the second wiring 65*b* will be described with reference to FIGS. 4A and 4B in addition to FIG. 3. FIG. 4A is a plan view illustrating a layout of the first wiring 65*a* of the embodiment, and FIG. 4B is a plan view illustrating a layout of the second wiring 65*b* of the embodiment. In order to easily visually recognize the layouts of the first wiring 65*a* and the second wiring 65*b*, a broken line is attached on the first wiring 65*a* in FIG. 4A, and a broken line is attached on the second wiring 65*b* in FIG. 4B. In order to easily visually recognize the positions of the detection terminal 80 and the thermistor 63, the detection terminal 80 is hatched in FIG. 4A, and the thermistor 63 is dotted in FIG. 4B.

The first wiring 65*a* is a relatively high-voltage wiring electrically connected to each of the plurality of energy storage devices 20. Specifically, as illustrated in FIGS. 3 and 4A, the first wiring 65*a* is a wiring connecting nine detection terminals 80 (80*a* to 80*i*) to the first connector 85. As illustrated in FIGS. 3 and 4B, the second wiring 65*b* is a wiring connecting the two thermistors 63 to the second connector 86. That is, the second wiring 65*b* is a wiring through which a temperature detection current flows, namely, a wiring for voltage lower than that of the first wiring 65*a*.

As illustrated in FIGS. 4A and 4B, the first connector 85 is disposed in the central portion of the harness plate 50, and the second connector 86 is disposed at the end of the harness plate 50. The external wiring is detachably connected to each of the first connector 85 and the second connector 86. For example, the control device that controls the energy storage apparatus 10 can measure the voltage at each energy storage device 20 of the energy storage apparatus 10 and the temperature of the energy storage apparatus 10 through the first connector 85, the second connector 86, and the external wiring connected to each of the first connector 85 and the second connector 86.

In the embodiment, among the nine detection terminals 80, each of the detection terminals 80*a* and 80*i* that are the two outermost detection terminals 80 is connected to the electrode terminal of the energy storage device 20. Specifically, the detection terminal 80*a* is connected to the negative electrode terminal 23 of the energy storage device 20A, and the detection terminal 80$i$ is connected to the positive electrode terminal 22 of the energy storage device 20H. Each of the detection terminal 80$a$ and the detection terminal 80$i$ is fixed to the electrode terminal by a nut (not illustrated in FIG. 3).

Each of the detection terminals 80$b$ to 80$h$ is connected to the bus bar 40 as illustrated in FIG. 3 and FIG. 4A. Specifically, each of the detection terminals 80$b$ to 80$h$ is fixed in contact with one bus bar 40 by the nut 90 as described above. One bus bar 40 is connected to the positive electrode terminal 22 of one of the two energy storage devices 20 adjacent to each other and the negative electrode terminal 23 of the other energy storage device 20. That is, each of detection terminals 80$b$ to 80$h$ is electrically connected to the positive electrode terminal 22 of one of the corresponding two energy storage devices 20 and the negative electrode terminal 23 of the other energy storage device 20. For example, the detection terminal 80$b$ is electrically connected to the positive electrode terminal 22 of the energy storage device 20A and the negative electrode terminal 23 of the energy storage device 20B.

With the above configuration, the control device connected to the first connector 85 can measure the voltage of one energy storage device 20 by measuring a potential difference between the two detection terminals 80. For example, the voltage of the energy storage device 20B is measured by measuring the potential difference between the detection terminal 80$b$ and the detection terminal 80$c$.

The first wiring 65$a$ can also be used as a wiring for homogenizing the voltage of each energy storage device 20. For example, when the voltage of the energy storage device 20B is higher than the voltages of other energy storage devices 20, the control device connected to the first connector 85 can discharge the energy storage device 20B by connecting the detection terminal 80$b$ and the detection terminal 80$c$ through a discharging circuit (balance circuit). Consequently, the voltage of the energy storage device 20B is decreased. That is, the voltages of the plurality of energy storage devices 20 are homogenized.

As illustrated to FIG. 4B, the thermistor 63 is attached to each of the detection terminal 80$a$ and the detection terminal 80$i$, and the two thermistors 63 are connected with the second connector 86 through the second wiring 65$b$. Specifically, a pair of electric wires is connected to the two thermistors 63 as the second wiring 65$b$. The control device connected to the second connector 86 can measure the temperature of the energy storage apparatus 10 thermally connected to the thermistor 63 by measuring a resistance value of the thermistor 63 through the pair of electric wire.

As described above, the energy storage apparatus 10 of the embodiment includes the energy storage device 20, the first wiring 65$a$ electrically connected to the energy storage device 20, the harness plate 50 holding the first wiring 65$a$, and the first connector 85 connected to the first wiring 65$a$, the first connector 85 being located at the central portion of the harness plate 50 and capable of detachably attaching the external wiring.

With this configuration, the first wiring 65$a$ electrically connected to the energy storage device 20 is provided in the energy storage apparatus 10 while held by the harness plate 50. For this reason, for example, in manufacturing (assembling) the energy storage apparatus 10, the first wiring 65$a$ can be incorporated into the energy storage apparatus 10 while held by the harness plate 50. Consequently, for example, the entrapment between members of the first wiring 65$a$ is hardly generated. For example, the possibility of generating the defect such as the disconnection of the first wiring 65$a$ or the disconnection of the connection portion between the first wiring 65$a$ and the detection terminal 80 is reduced as compared with the case that the freedom degree of movement of the first wiring 65$a$ is high. Additionally, the first connector 85 is located at the central portion of the harness plate 50, so that the possibility of the damage of the first connector 85 that is in the energized state with the energy storage device 20 is reduced when the moving body on which the energy storage apparatus 10 is mounted generates the crush or the like. That is, the generation of the unsafe event such as the external short circuit due to the damage to the first connector 85 is prevented.

In an automobile such as EV or PHEV, it is assumed that the energy storage apparatus 10 is disposed in a posture in which the harness plate 50 is located above the plurality of energy storage devices 20, namely, in a posture in which the positive side in the Z-axis direction of the embodiment becomes upward. In this case, for example, when the traveling automobile collides with the object, the impact is mainly applied to the energy storage apparatus 10 from the side (a direction parallel to the XY-plane). Under this condition, a part of the harness plate 50 always exists in the side of the first connector 85 located in the central portion of the harness plate 50 in planar view (when viewed from the direction in which the harness plate 50 and the plurality of energy storage devices 20 are aligned). For this reason, for example, a part of the harness plate 50 located around the first connector 85 functions as a shock absorbing member that absorbs the impact. As a result, the impact given to the first connector 85 is prevented. That is, it can be said that the first connector 85 is disposed in the harness plate 50 at a position where the impact caused by the crush or the like is hardly received.

As described above, the energy storage apparatus 10 of the embodiment is the high-safety energy storage apparatus 10 including the first connector 85 to which the external wiring can detachably be attached.

In the embodiment, for example, as illustrated in FIG. 1, the opening 100$a$ is provided in the central portion of the lid 100 covering the harness plate 50. For this reason, even if the lid 100 is disposed above the harness plate 50, the connection port 85$a$ of the first connector 85 (the opening that the end of the external wiring is inserted into and removed from) is exposed from the opening 100$a$. Thus, the external wiring can be attached and detached to and from the first connector 85.

In the embodiment, the harness plate 50 is disposed between the positive electrode terminal 22 and the negative electrode terminal 23 of each of the plurality (in the embodiment, eight) of energy storage devices 20. That is, the harness plate 50 is disposed using the space between the positive electrode terminal 22 and the negative electrode terminal 23 that are provided so as to protrude from the case 21 of the energy storage device 20.

That is, the harness plate 50 is located in the central portion of the energy storage apparatus 10, for example, in the direction in which the positive electrode terminal 22 and the negative electrode terminal 23 are arranged (X-axis direction). For example, when the impact is applied to the energy storage apparatus 10 from the side in the X-axis direction, the influence of the impact on the harness plate 50 is reduced. As a result, for example, the protection of the first connector 85 against the impact is further ensured.

In the embodiment, a length of the harness plate 50 in the arrangement direction (Y-axis direction) of the plurality of energy storage devices 20 is substantially equal to a width in the Y-axis direction of the energy storage unit constructed with the plurality of energy storage devices 20 (for example, see FIG. 4A). Thus, in planar view, it can be said that the first connector 85 is located in the central portion of the energy storage apparatus 10, and that the second connector 86 is located at the end of the energy storage apparatus 10.

The energy storage apparatus 10 of the embodiment includes the second wiring 65b that is the wiring for the voltage lower than that of the first wiring 65a and is held by the harness plate 50 and the second connector 86 that is connected the second wiring 65b and located at the end of the harness plate 50.

With this configuration, in the energy storage apparatus 10 in which the possibility of the damage to the first connector 85 for high voltage is reduced during the generation of the crush, ease of the attachment and the detachment of the external wiring to and from the second connector 86 for low voltage is ensured, the second connector 86 for low voltage being located at the end of the harness plate 50.

At this point, the connector can generate the damage when excessive external force is applied to the connector due to collision of the moving body on which the energy storage apparatus 10 is mounted with the object or the forced attachment and detachment of the external wiring to and from the connector. When the connector is damaged, a state of the energy storage apparatus 10 cannot correctly be checked, or a safety problem such as the generation of the external short circuit may be generated.

In the energy storage apparatus 10 of the embodiment, the first connector 85 to which the relatively high voltage is applied reduces the possibility of the damage in an emergency such as the crush. As to the second connector 86 to which the relatively low voltage is applied, the possibility of the damage to the second connector 86 during the attachment and detachment of the external wiring is reduced by securing the ease of the attachment and detachment of the external wiring. Consequently, the energy storage apparatus having the highly safety is obtained.

The harness plate 50 of the embodiment has a structure regulating the position of the internal wiring 65 that tends to be complicated. This structure will be described with reference to FIG. 5 in addition to FIGS. 4A and 4B.

Figure 5:
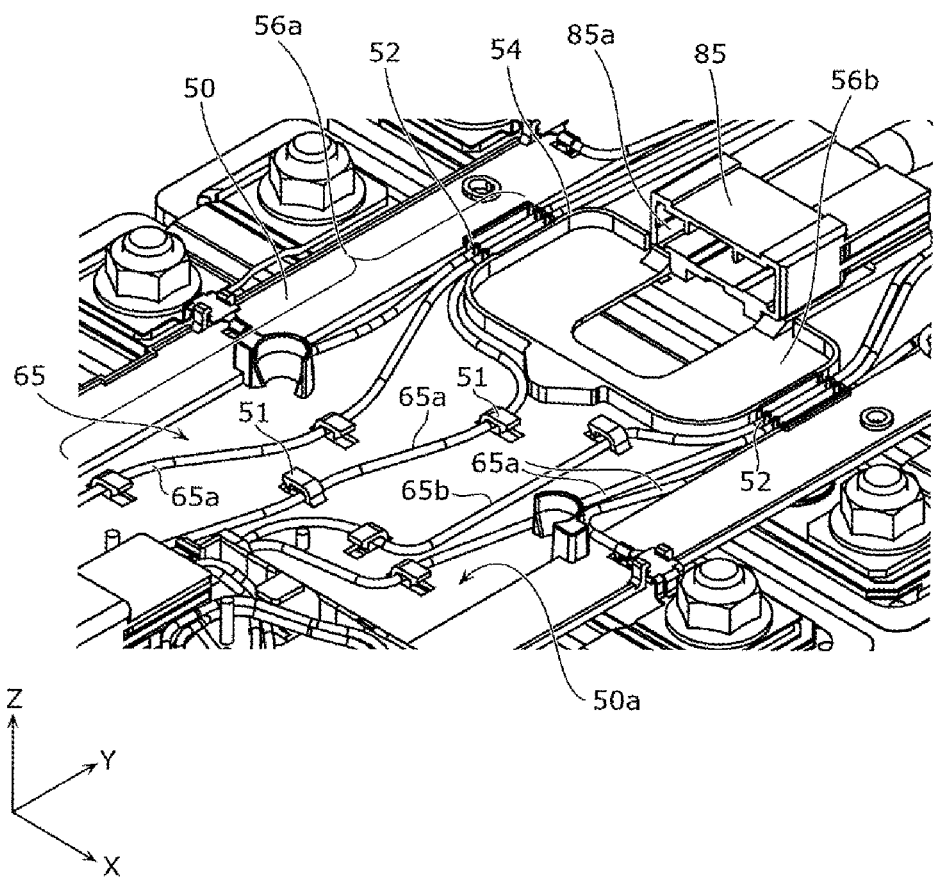
FIG. 5 is an enlarged perspective view illustrating a part of a harness plate according to the embodiment.

FIG. 5 is an enlarged perspective view illustrating a part of the harness plate 50 of the embodiment. Specifically, a portion of the harness plate 50 on the front side (the side of the connection port 85a) of the first connector 85 is enlarged in FIG. 5.

As illustrated in FIG. 5, the harness plate 50 of the embodiment includes the restricting portion (51, 52). In a first region 56a (see FIGS. 4A and 4B), the restricting portion (51, 52) restricts the first wiring 65a and the second wiring 65b at the positions arranged in a direction intersecting with the arrangement direction (Z-axis direction) of the energy storage device 20 and the harness plate 50.

Specifically, the harness plate 50 is provided with the first restricting portion 51 that is a pawl-shaped member and the second restricting portion 52 that is a protrusion-shaped member ae provided in the harness plate 50 as the restricting portion of the embodiment. Each of the plurality of first restricting portions 51 hooks and holds the first wiring 65a or the second wiring 65b. One set of the second restricting portions 52 among the plurality of second restricting portions 52 holds the first wiring 65a or the second wiring 65b while the first wiring 65a or the second wiring 65b is sandwiched between one set of the second restricting portions 52. The first wiring 65a and the second wiring 65b are restricted at the positions arranged in the direction (the direction along the XY-plane) along the top surface (a disposition surface of the internal wiring 65) of the harness plate 50 by at least one of the first restricting portion 51 and the second restricting portion 52. Consequently, in the first region 56a of the harness plate 50, the first wirings 65a do not vertically overlap each other, and the second wirings 65b do not vertically overlap each other, and the first wirings 65a and the second wirings 65b do not vertically overlap each other.

As described above, in the harness plate 50 of the embodiment, the first wiring 65a and the second wiring 65b do not vertically overlap each other at least in the first region 56a, so that the increase of the size in the vertical direction is prevented. Specifically, in the harness plate 50 of the embodiment, using the space between the plurality of energy storage devices 20 and the lid 100, the first wiring 65a and the second wiring 65b can be held while the space is not wasted. More specifically, as described above, the harness plate 50 is disposed in the space between the positive electrode terminal 22 and the negative electrode terminal 23. Thus, the increase of the size of the energy storage apparatus 10 due to the existence of the harness plate 50 in the energy storage apparatus 10 is prevented.

The possibility of the disconnection of the first wiring 65a or the second wiring 65b due to the pressing force from the lid 100 is reduced even if the lid 100 (see FIGS. 1 and 2) is disposed above the harness plate 50. This contributes to the improvement of the safety of the energy storage apparatus 10.

In the embodiment, the heights of the first restricting portion 51 and the second restricting portion 52 (the height from a disposition surface 50a of the internal wiring 65 in the harness plate 50) are identical to each other (including substantially identical to each other). The low surface portion 105 of the lid 100 opposed to the first region 56a exists at a level to abut on the first restricting portion 51 and the second restricting portion 52. For this reason, the first restricting portion 51 and the second restricting portion 52 also function as a support causing the lid 100 (the low surface portion 105) not to press the first wiring 65a and the second wiring 65b.

In the embodiment, the portion between both ends (the covered portion) of each of the first wiring 65a and the second wiring 65b (more particularly, each of the plurality of electric wires constituting the first wiring 65a and the second wiring 65b) is held by the restricting portion (at least one of the first restricting portion 51 and the second restricting portion 52) of the harness plate 50. For this reason, the posture or the position of the flexible first wiring 65a and the second wiring 65b in the outer case 11 can stably be maintained.

As illustrated in FIGS. 4A, 4B, and 5, in the harness plate 50 of the embodiment, the first wiring 65a and the second wiring 65b are disposed while detouring around the second region 56b on the opening (connection port 85a) side of the first connector 85.

The second region 56b is a region in the side of the first connector 85 in planar view, and is a region on the side on which the connection port 85a is provided. For example, the size and the shape of the second region 56b are determined by the size and the shape of the connector provided at the end of the external wiring, the connector being inserted into the connection port 85a.

With this configuration, for example, as to the first connector 85 disposed in the central portion of the harness plate 50, the ease of the attachment and detachment of the external wiring is ensured. For this reason, the possibility of the damage to the first connector 85 in attaching and detaching the external wiring to and from the first connector 85 is reduced. That is, because the space does not exist in front of the connection port 85a of the first connector 85, a possibility of performing an operation to apply unnecessary stress to the first connector 85 such that the external wiring is obliquely inserted into the connection port 85a is reduced.

In the embodiment, the connection port 85a of the first connector 85 is open toward the direction along the disposition surface 50a of the internal wiring 65 in the harness plate 50. That is, when the external wiring is inserted into the connection port 85a of the first connector 85, the direction in which the external wiring protrudes from the first connector 85 is the direction along the disposition surface 50a. Thus, for example, the external wiring can be connected to the first connector 85 in a posture in which the external wiring does not protrude from the energy storage apparatus 10. Consequently, for example, the possibility of the damage to the external wiring or the first connector 85 due to the application of external force to the external wiring can be reduced.

The harness plate 50 includes a wall 54 standing along at least a part of the periphery of the second region 56b. As described above, the wall 54 is provided on the harness plate 50, so that the first wiring 65a and the second wiring 65b can forcedly be positioned out of the second region 56b during or after the disposition of the first wiring 65a and the second wiring 65b in the harness plate 50. For this reason, for example, the ease of the attachment and the detachment of the external wiring to and from the first connector 85 is further ensured. Thus, the possibility of the damage to the first connector 85 in attaching and detaching the external wiring to and from the first connector 85 is reduced.

In the embodiment, the wall 54 is disposed in the harness plate 50 so as to surround the second region 56b. Consequently, the first wiring 65a and the second wiring 65b can substantially completely be eliminated from the second region 56b. For example, when a worker attaches and detaches the external wiring to and from the first connector 85 after the disposition of the lid 100, a finger of the worker is prevented from touching the first wiring 65a or the second wiring 65b. That is, the safety is improved during the attachment and detachment of the external wiring to and from the first connector 85.

Figure 6:
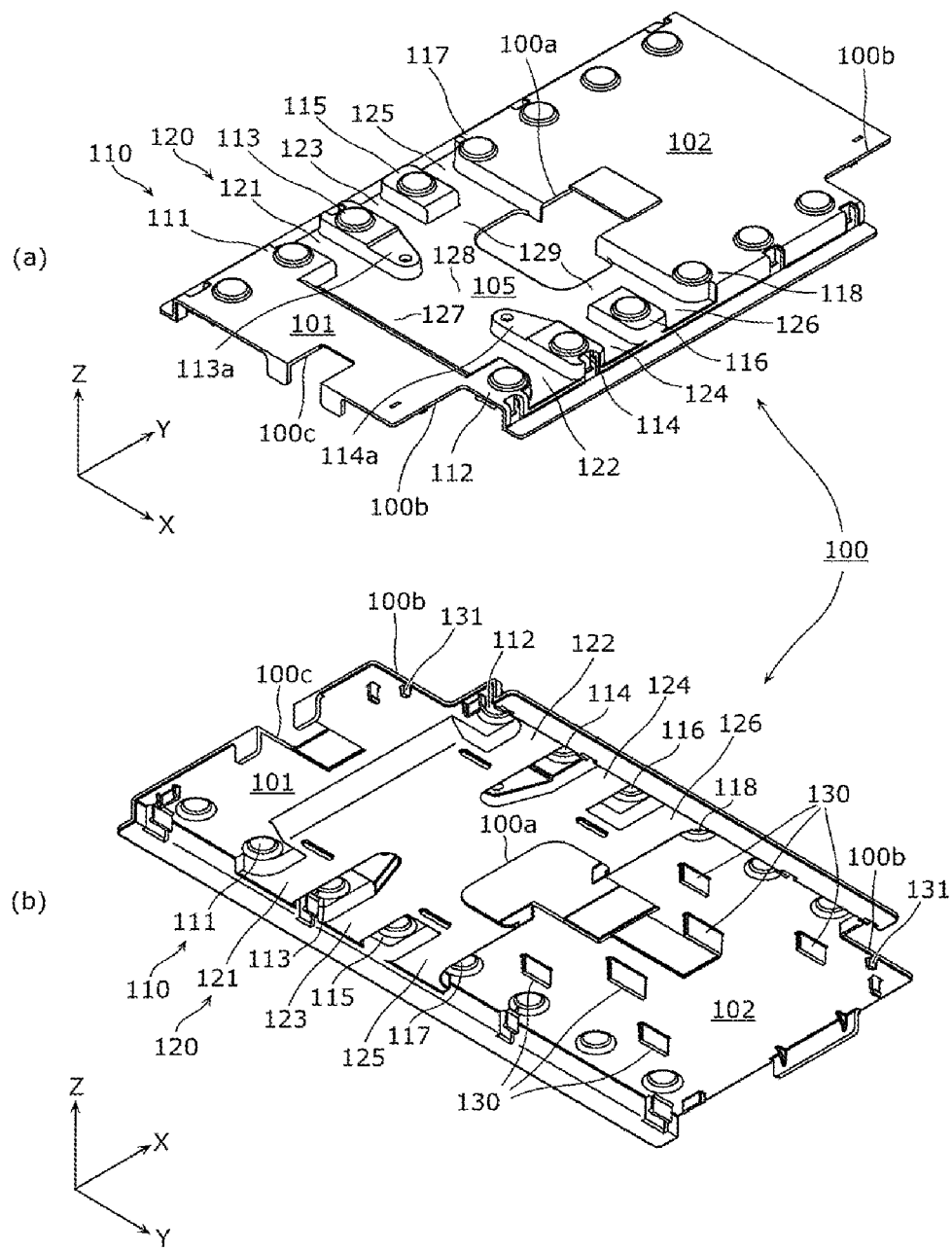
FIG. 6 is a perspective view illustrating a configuration of a lid in the energy storage apparatus according to the embodiment.
Figure 7:
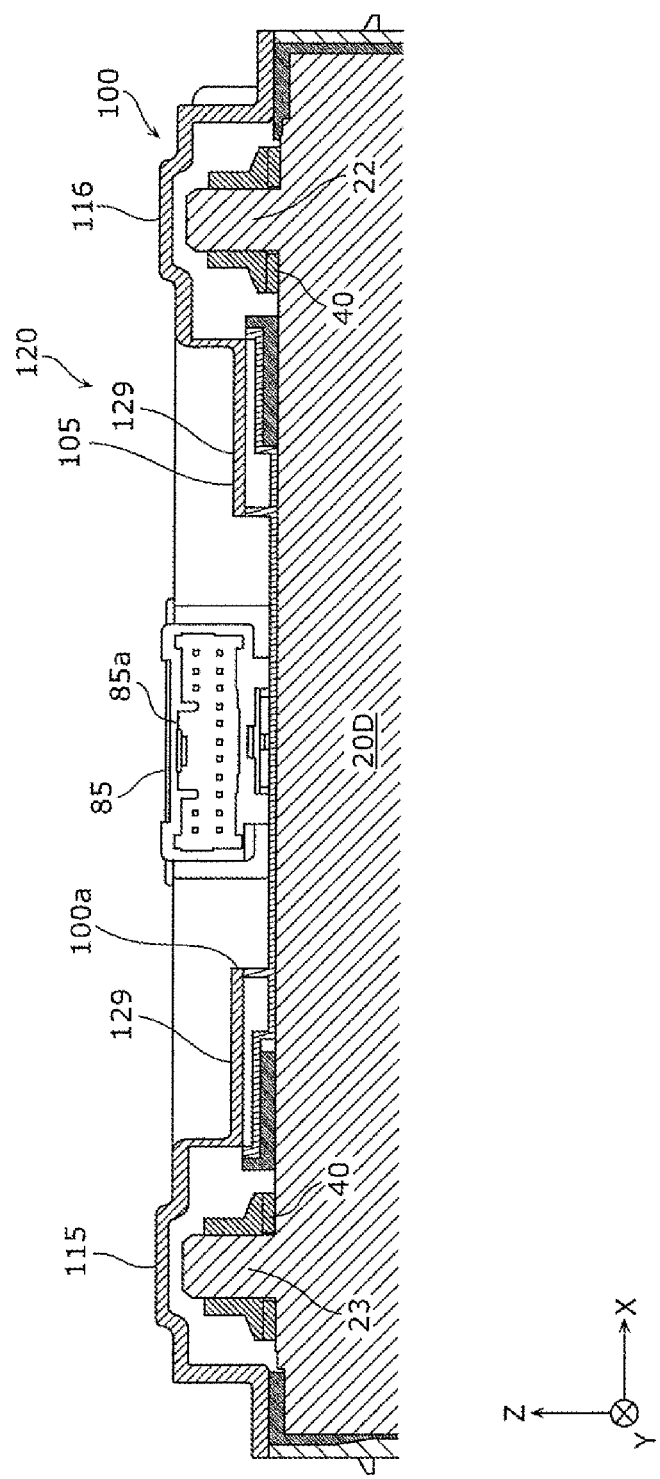
FIG. 7 is a sectional view illustrating a configuration of the lid of the energy storage apparatus according to the embodiment and a periphery of the lid.
Figure 8:
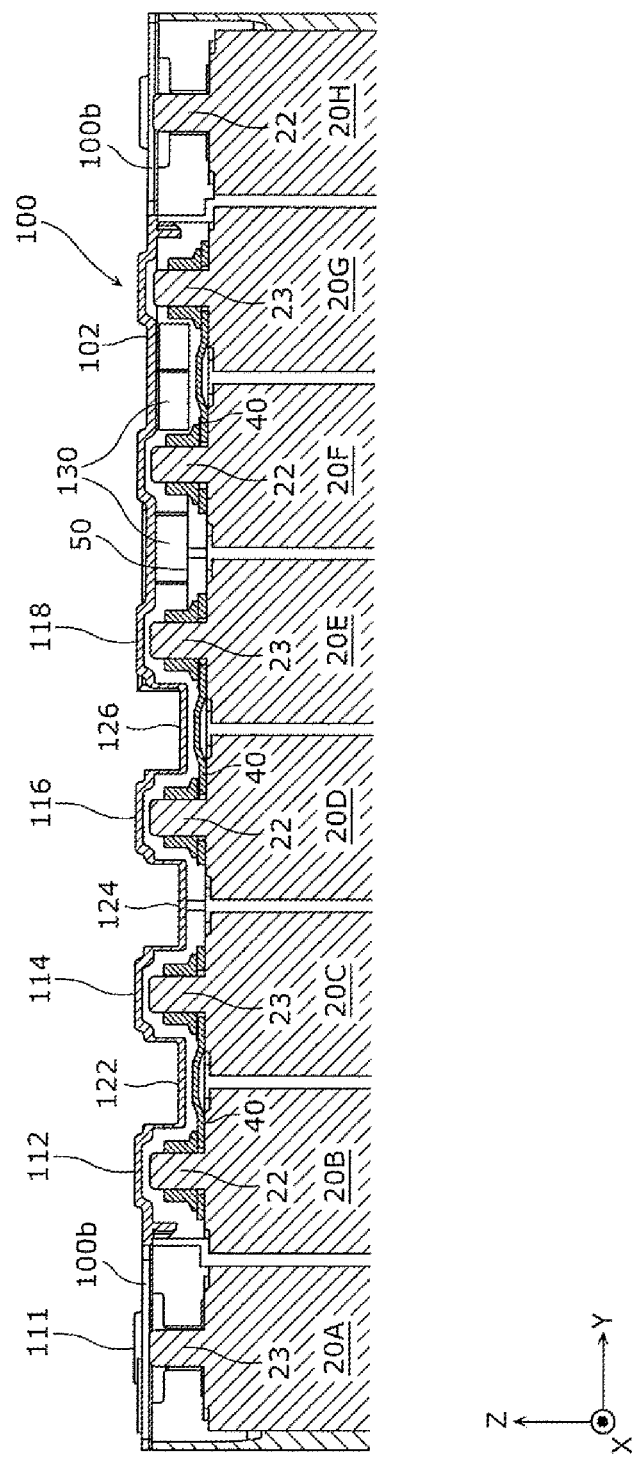
FIG. 8 is a sectional view illustrating the configurations of the lid of the energy storage apparatus according to the embodiment and the periphery of the lid.

The configuration of the lid 100 of the energy storage apparatus 10 and the configuration of the lid 100 and the periphery of the lid 100 will be described in detail below. FIG. 6 is a perspective view illustrating the configuration of the lid 100 of the energy storage apparatus 10 of the embodiment. Specifically, FIG. 6(a) is an enlarged perspective view illustrating the configuration of the lid 100 in FIG. 2, and FIG. 6(b) is a perspective view illustrating the lid 100 when viewed from obliquely below. FIGS. 7 and 8 are sectional views illustrating the configurations of the lid 100 of the energy storage apparatus 10 of the embodiment and the periphery of the lid 100. Specifically, FIG. 7 is a sectional view illustrating the configuration of the lid 100 and the periphery of the lid 100 when the energy storage apparatus 10 in FIG. 1 is cut along a plane parallel to an XZ-plane including a line VII-VII. FIG. 8 is a sectional view illustrating the configuration of the lid 100 and the periphery of the lid 100 when the energy storage apparatus 10 in FIG. 1 is cut along a plane parallel to a YZ-plane including a line VIII-VIII.

As illustrated in FIGS. 7 and 8, the lid 100 includes a protrusion 110 disposed opposite to the bus bar 40, an outer surface of the protrusion being protruded and a recess 120 disposed adjacent to the protrusion 110, an outer surface of the recess being recessed. In the embodiment, the protrusion 110 is a protrusion disposed opposite to the electrode terminal of the energy storage device 20. The protrusion 110 is an example of the first protrusion.

Specifically, the protrusion 110 includes protrusions 111 and 112 at positions opposed to the negative electrode terminal 23 and the positive electrode terminal 22 of the energy storage device 20B. That is, the protrusion 110 includes the protrusions 111 and 112 at positions opposed to the bus bar 40 connected to the negative electrode terminal 23 of the energy storage device 20B and the bus bar 40 connected to the positive electrode terminal 22 of the energy storage device 20B. The protrusion 110 includes protrusions 113 and 114 at positions opposed to the positive electrode terminal 22 and the negative electrode terminal 23 of the energy storage device 20C. That is, the protrusion 110 includes the protrusions 113 and 114 at positions opposed to the bus bar 40 connected to the positive electrode terminal 22 of the energy storage device 20C and the bus bar 40 connected to the negative electrode terminal 23 of the energy storage device 20C.

Similarly, the protrusion 110 includes protrusions 115 to 118 at positions opposed to the negative electrode terminal 23 and the positive electrode terminal 22 of the energy storage device 20D and the positive electrode terminal 22 and the negative electrode terminal 23 of the energy storage device 20E. That is, the protrusion 110 includes the protrusions 115 to 118 at positions opposed to the bus bar 40 connected to the negative electrode terminal 23 of the energy storage device 20D, the bus bar 40 connected to the positive electrode terminal 22 of the energy storage device 20D, the bus bar 40 connected to the positive electrode terminal 22 of the energy storage device 20E, and the bus bar 40 connected to the negative electrode terminal 23 of the energy storage device 20E.

The protrusions 111 and 112 are connected together with the protrusion opposed to the positive electrode terminal 22 of the energy storage device 20A to form one large protrusion 101. In the protrusion 101, the opening 100b is formed at the position opposed to the negative electrode terminal 23 of the energy storage device 20A. The protrusions 117 and 118 are connected together with the protrusions opposed to the positive electrode terminal 22 and the negative electrode terminal 23 of the energy storage devices 20F and 20G and the negative electrode terminal 23 of the energy storage device 20H to form one large protrusion 102. In the protrusion 102, the opening 100b is formed at the position opposed to the positive electrode terminal 22 of the energy storage device 20H.

At this point, the protrusion 110 (protrusions 111 to 118) is a member having an irregularity structure, in which the outer surface of the lid 100 protrudes and the inner surface is recessed, and the bolt and the nut of the electrode terminal of the energy storage device 20 are disposed in the recessed portion of the inner surface. That is, the protrusion 110 is disposed so as to cover the upper portion and the periphery of the upper portion of the electrode terminal of the energy storage device 20.

The recess 120 includes first recesses 121 to 126 disposed between the two protrusions 110 that are disposed opposed to the electrode terminals of the two different energy storage devices 20. Specifically, the first recess 121 is a recess that is disposed between the protrusions 111 and 113 that are the two protrusions 110 opposed to the negative electrode terminal 23 of the energy storage device 20B and the positive electrode terminal 22 of the energy storage device 20C that are the electrode terminal of two energy storage devices 20 adjacent to each other. Similarly, the first recess 122 is a recess disposed between the protrusions 112 and 114 opposed to the positive electrode terminal 22 of the energy storage device 20B and the negative electrode terminal 23 of the energy storage device 20C. The same applies to the first recesses 123 to 126.

The recess 120 includes second recesses 127 to 129 disposed between the two protrusions 110 that are disposed opposite to the two electrode terminals of the identical energy storage device 20. Specifically, the second recess 127 is a recess disposed between the protrusions 111 and 112 that are the two protrusions 110 opposed to the negative electrode terminal 23 and the positive electrode terminal 22 of the energy storage device 20B. Similarly, the second recess 128 is a recess disposed between the protrusions 113 and 114 opposed to the negative electrode terminal 23 and the positive electrode terminal 22 of the energy storage device 20C, and the second recess 129 is a recess disposed between the protrusions 115 and 116 opposed to the negative electrode terminal 23 and the positive electrode terminal 22 of the energy storage device 20D.

Thus, the recess 120 is one large recess formed by connecting the first recesses 121 to 126 and the second recesses 127 to 129, and includes the low surface portion 105 on the bottom surface. The opening 100a is formed at the boundary between the low surface portion 105 of the recess 120 and the protrusion 102. Then, the first connector 85 is disposed in the opening 100a. Consequently, as illustrated in FIG. 7, the connection port 85a of the first connector 85 is disposed so as to be open toward the direction along the low surface portion 105 that is the bottom surface of the recess 120 and inward the recess 120.

The outer case 11 includes ribs 130, 131 opposed to the harness plate 50 in a portion in which the recess 120 is not formed. That is, the rectangular ribs 130, 131 protruding downward (the negative side of the Z-axis direction) are disposed on the inner surface (surface on the negative side of the Z-axis direction) of the protrusion 110 (protrusions 101 and 102) of the lid 100. Specifically, as illustrated in FIG. 8, the ribs 130 protrudes toward the harness plate 50, and is disposed at the position where the leading end of the rib 130 abuts on the top surface of the harness plate 50.

The rib 131 protrudes toward the inner lid 30, and is disposed at the position where the opening 31 of the inner lid 30 is closed. That is, the rib 131 is disposed at the position where the opening 31 that is an opening adjacent to the thermistor 63 is closed. In the embodiment, the rib 131 is disposed so as to abut on the top surface at the leading end of the detection terminal 80 connected to the thermistor 63, presses the thermistor 63 from above, and closes at least a part of the opening 31 in the vicinity of the thermistor 63.

Holders 113a, 114a holding the external wiring in the recess 120 are provided in the lid 100. The holders 113a, 114a are protrusions formed continuously with the protrusions 113, 114 between the protrusion 113 and the protrusion 114, and a through-hole is made at the leading end of the protrusion. That is, the external wiring is connected to the energy storage apparatus 10, disposed in the recess 120, and held in the recess 120 by the holders 113a, 114a.

One energy storage apparatus (battery pack) can be constructed by combining a plurality of energy storage apparatuses 10 of the embodiment. An energy storage apparatus (battery pack) 1 of the embodiment will be described with reference to FIGS. 9 and 10. Hereinafter, the description will be made while the plurality of energy storage apparatuses 10 are replaced with a plurality of energy storage units 10. That is, the energy storage apparatus 1 is a battery pack including the plurality of energy storage units 10.

Figure 9:
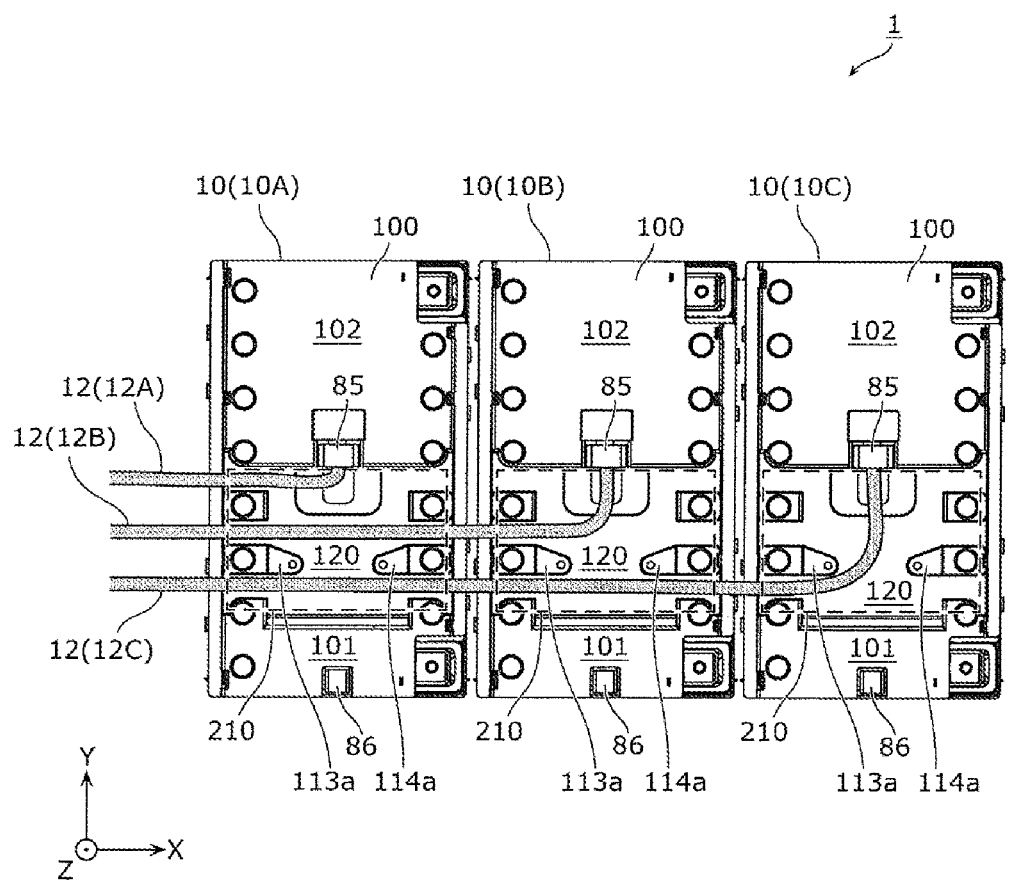
FIG. 9 is a plan view illustrating a first configuration example of the energy storage apparatus (battery pack) according to the embodiment.
Figure 10:
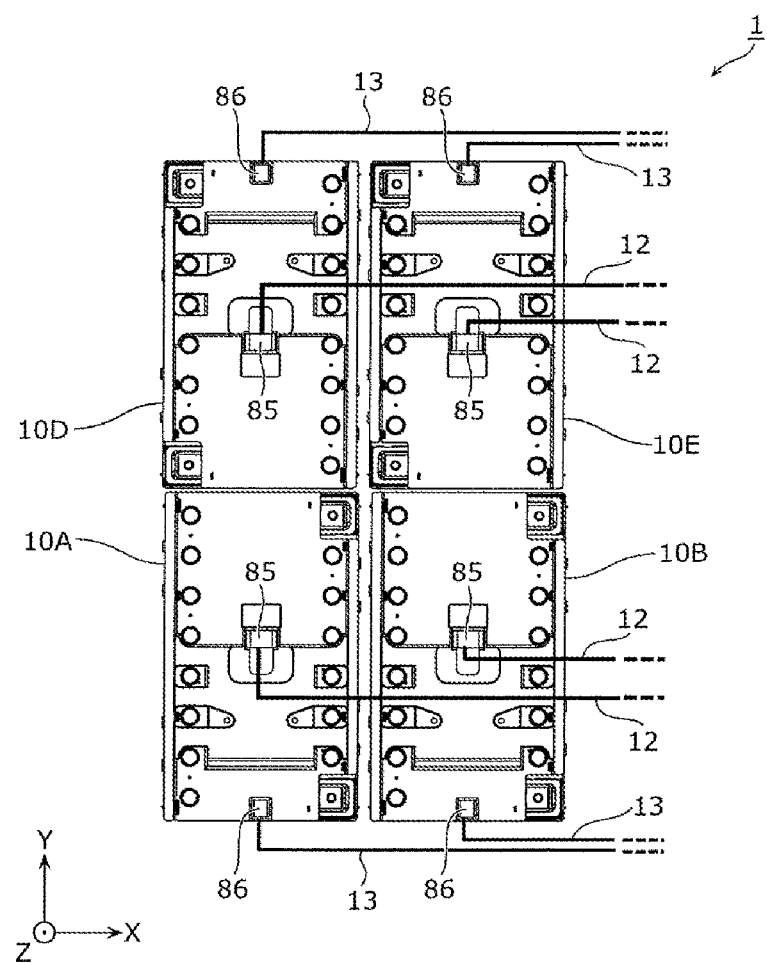
FIG. 10 is a plan view illustrating a second configuration example of the energy storage apparatus (battery pack) according to the embodiment.

FIG. 9 is a plan view illustrating a first configuration example of the energy storage apparatus (battery pack) 1 of the embodiment, and FIG. 10 is a plan view illustrating a second configuration example of the energy storage apparatus (battery pack) 1 of the embodiment. In FIG. 10, the external wiring is schematically represented by a bold line.

As described above, the low surface portion 105 of the recess 120 constituting the outer surface closer to the harness plate 50 than other portions is formed in the lid 100 of the energy storage unit 10 of the embodiment. The low surface portion 105 exists at the position opposed to the first region 56a (see FIGS. 4A and 4B) of the harness plate 50.

That is, as described above with reference to FIG. 5, in the first region 56a, the first wiring 65a and the second wiring 65b are disposed so as not to vertically overlap each other, and therefore the low surface portion 105 can be formed at the position opposed to the first region 56a.

In the embodiment, the low surface portion 105 is provided as a recessed portion existing between the protrusion 101 and the protrusion 102 in the lid 100, and the external wiring can be disposed using the recessed portion as illustrated in FIG. 9.

Specifically, the energy storage apparatus 1 in FIG. 9 includes a first energy storage unit 10A, a second energy storage unit 10B, and a third energy storage unit 10C that are three energy storage units 10 and a first conductive member 12A, a second conductive member 12B, and a third conductive member 12C that are three conductive members 12. The first conductive member 12A is an external wiring (external harness) connected to the first energy storage unit 10A. Similarly, the second conductive member 12B and the third conductive member 12C are external wirings (external harnesses) connected to the second energy storage unit 10B and the third energy storage unit 10C, respectively.

The first conductive member 12A is connected to the first connector 85 of the first energy storage unit 10A, the second conductive member 12B is connected to the first connector 85 of the second energy storage unit 10B, and the third conductive member 12C is connected to the first connector 85 of the third energy storage unit 10C. At this point, the first conductive member 12A is disposed in the recess 120 (low surface portion 105) of the first energy storage unit 10A, and the second conductive member 12B is disposed in the recess 120 (low surface portion 105) of the first energy storage unit 10A and the recess 120 (low surface portion 105) of the second energy storage unit 10B. Similarly, the third conductive member 12C is disposed in the recess 120 (low surface portion 105) of the first energy storage unit 10A, the recess 120 (low surface portion 105) of the second energy storage unit 10B, and the recess 120 (low surface portion 105) of the third energy storage unit 10C.

Specifically, the first conductive member 12A is disposed in a first recess 125 of the first energy storage unit 10A. The second conductive member 12B is disposed in the first recesses 123 and 124 of the first energy storage unit 10A and the first recess 123 and the second recess 129 of the second energy storage unit 10B. Similarly, the third conductive member 12C is disposed in the first recesses 121 and 122 of the first energy storage unit 10A, the first recesses 121 and 122 of the second energy storage unit 10B, and the first recess 121 and the second recesses 128 and 129 of the third energy storage unit 10C. These conductive members 12 (external wirings) are connected to a substrate or the like, and control such as the charge and the discharge of the energy storage device 20 in the energy storage apparatus 1 is performed.

A harness cover 210 (outline is illustrated by a broken line in FIG. 9) covering the conductive member 12 may be disposed in each of the energy storage units 10. The protrusion 101 and the protrusion 102 may be connected by the harness cover 210 while being flush with each other.

The holders 113a, 114a are provided on the lid 100 of the outer case 11 of each energy storage unit 10. The harness cover 210 is placed on and fixed to the holders 113a, 114a, thereby holding the conductive member 12 in the recess 120. The protrusion provided in the harness cover 210 is inserted into the through-hole made in the holders 113a, 114a, thereby fixing the harness cover 210 to the lid 100.

As described above, when the energy storage units 10 of the embodiment are arranged such that the low surface portions 105 of the respective energy storage units 10 are aligned, a passage of at least one external wiring is formed by the low surface portions 105 of the energy storage units 10. By disposing at least one external wiring in the passage, the energy storage apparatus 1 can be constructed without increasing the size in the height direction (Z-axis direction).

Because the first connector 85 of each of the plurality of energy storage units 10 included in the energy storage apparatus 1 is located inside the end of the energy storage apparatus 1 in planar view, the damage of the first connector 85 is hardly generated even if the moving body on which the energy storage apparatus 1 is mounted generates the crush.

As described above, when energy storage apparatus rows each of which is constructed by arranging the plurality of energy storage units 10 in the X-axis direction are arranged in the Y-axis direction, the energy storage apparatus rows can be arranged close to each other as illustrated in FIG. 10.

Specifically, in the energy storage unit 10 of the embodiment, in planar view, the first connector 85 is disposed in the central portion, and the second connector 86 is disposed at the end. For this reason, for example, when the two energy storage units 10 are arranged in the direction in which the first connector 85 and the second connector 86 are aligned (Y-axis direction), the second connectors 86 of the two energy storage units 10 are disposed in opposite directions.

That is, as illustrated in FIG. 10, when the energy storage apparatus row including the first energy storage unit 10A and the second energy storage unit 10B and the energy storage apparatus row including the fourth energy storage unit 10D and the fifth energy storage unit 10E are arranged, the two energy storage apparatus rows are arranged such that the second connector 86 of each energy storage apparatus row is oriented outward. Consequently, the two energy storage apparatus rows can be arranged close to each other, and the easiness of the attachment and detachment of the external wiring (conductive member 13) to and from the second connector 86 is also ensured.

The number of energy storage units 10 of the energy storage apparatus 1 is not particularly limited. The number of energy storage units 10 may be decided according to specifications of the moving body on which the energy storage apparatus 1 is mounted. Only one energy storage unit 10 may be disposed. When the plurality of energy storage units 10 are disposed, any number of storage units 10 may be disposed at any position. Although not illustrated in FIGS. 9 and 10, the energy storage apparatus 1 may include a housing that accommodates the plurality of energy storage units 10 of the energy storage apparatus 1.

As described above, the outer case 11 of the energy storage unit 10 includes protrusion 110 opposed to the bus bar 40 and the recess 120 adjacent to the protrusion 110, and the conductive member 12 connected to the energy storage unit 10 is disposed in the recess 120. As described above, the conductive member 12 is disposed in the recess 120 of the outer case 11, so that the contact of the conductive member 12 with another conductive member or the entrapment between the outer case 11 and another member can be prevented. Consequently, the conductive member 12 is energized with another conductive member, and the damage to the conductive member 12 and the outer case 11 is prevented, so that the safety can be secured.

Because the portion in which the bus bar 40 is disposed protrudes outward, when the outer case 11 is formed along the bus bar 40, the protrusion 110 is formed opposite to the bus bar 40 of the outer case 11, and the recess 120 is formed adjacent to the protrusion 110. Consequently, by disposing the conductive member 12 such as the external wiring connected to the energy storage unit 10 in the recess 120, the space in the recess 120 can effectively be used to achieve the space saving.

Because the electrode terminal of the energy storage device 20 protrudes outward, when the outer case 11 is formed along the electrode terminal, the protrusion 110 is formed at the position opposed to the electrode terminal of the outer case 11, and the recess 120 is formed at a position adjacent to the protrusion 110. Consequently, by disposing the conductive member 12 such as the external wiring connected to the energy storage unit 10 in the recess 120, the space in the recess 120 can effectively be used to secure the safety, the space saving can be achieved.

The first recesses 121 to 126 are formed between the two protrusions 110 opposed to the electrode terminals of the two different energy storage devices 20 in the outer case 11 of the energy storage unit 10. That is, the first recesses 121 to 126 are formed in the outer surface of the outer case 11 so as to be opposed to the gap between the electrode terminals of the different energy storage devices 20, and the conductive member 12 is disposed in one of the first recesses 121 to 126. Consequently, the gap between the electrode terminals of the different energy storage devices 20 can effectively be used to secure the safety, the space saving can be achieved.

The second recesses 127 to 129 are formed between the two protrusions 110 opposed to the two electrode terminals of the identical energy storage device 20 in the outer case 11 of the energy storage unit 10. That is, the second recesses 127 to 129 are formed in the outer surface of the outer case 11 so as to be opposed to the gap between the electrode terminals of the identical energy storage device 20, and the conductive member 12 is disposed in one of the second recesses 127 to 129. Consequently, the gap between the electrode terminals of the identical energy storage device 20 can effectively be used to secure the safety, the space saving can be achieved.

The energy storage unit 10 includes the first connector 85 to which the external wiring as the conductive member 12 is connected, and the connection port 85a of the first connector 85 is disposed so as to be open toward the direction along the low surface portion 105 that is the bottom surface of the recess 120 of the outer case 11 and inward the recess 120. The connection port 85a of the first connector 85 is open toward the recess 120 of the outer case 11, so that the external wiring can be disposed in the recess 120 and connected to the first connector 85. Consequently, the recess 120 is effectively used as the space for connecting the external wiring to the first connector 85, so that the safety can be secured to achieve the space saving.

By disposing the first connector 85 in the central portion of the outer case 11, the first connector 85 and the external wiring (conductive member 12) connected to the first connector 85 can be protected from the external impact and the like. That is, because the protrusion 110 is disposed outside the first connector 85 by disposing the first connector 85 in the recess located in the central portion of the outer case 11, the protrusion 110 prevents the first connector 85 and the external wiring from interfering with an external member, and the first connector 85 and the external wiring can effectively be protected. For example, when the external wiring is electrically connected to the electrode terminal of the energy storage device 20, the external wirings may come in contact with each other to generate a short circuit, so that the short circuit can be protected. As described above, by disposing the first connector 85 in the central portion of the outer case 11, the first connector 85 and the external wiring can effectively be protected to secure the safety while the space saving is achieved.

The outer case 11 includes the holders 113*a*, 114*a* holding the conductive member 12 in the recess 120. That is, when the harness cover 210 is held by the holders 113*a*, 114*a* of the lid 100, the conductive member 12 is held in the recess 120. For this reason, the conductive member 12 is held by the recess 120 of the outer case 11, and the conductive member 12 can be prevented from floating from the recess 120 or releasing from the outer case 11. Thus, when the conductive member 12 is held in the recess 120 so as not to protrude from the recess 120, the safety can be secured, and the space saving can be achieved.

The energy storage apparatus 1 includes the first energy storage unit 10A and the second energy storage unit 10B that are the energy storage unit 10 and the first conductive member 12A and the second conductive member 12B that are the conductive members 12. The second conductive member 12B is disposed in the recess 120 of the outer case 11 of the first energy storage unit 10A. Thus, the space in the recess 120 of the outer case 11 of the first energy storage unit 10A is effectively used as the space where the second conductive member 12B connected to the second energy storage unit 10B is disposed, so that the safety can be secured, and the space saving can be achieved.

In the outer case 11, the ribs 130, 131 opposed to the harness plate 50 are provided in the portion in which the recess 120 is not formed. That is, because the gap is generated between the harness plate 50 and the portion in which the recess 120 of the outer case 11 is not formed, the ribs 130, 131 are disposed between the harness plates 50 and the portion in which the recess 120 of the outer case 11 is not formed. As described above, even if the recess 120 is formed in the outer case 11 in order to dispose the conductive member 12, the gap with the harness plate 50 can be filled with the ribs 130, 131. For this reason, the harness plate 50 and the internal wiring 65 on the harness plate 50, the first connector 85, the second connector 86, and the like can be prevented from floating.

Because the rib 131 of the outer case 11 is disposed at the position closing the opening 31 adjacent to the thermistor 63, the opening 31 near the thermistor 63 is closed using the rib 131 of the outer case 11 to prevent the thermistor 63 from being affected by the external temperature. Thus, the rib 131 of the outer case 11 that fills the gap with the harness plate 50 can be used also as the rib that closes the opening 31 near the thermistor 63.

Modification

A modification of the embodiment will be described below. In the above embodiment, the electrode terminal of the energy storage device 20 is the bolt terminal including the bolt, the bolt is inserted into the through-hole of the bus bar 40, and the nut is fastened to the bolt, whereby the electrode terminal of the energy storage device 20 and the bus bar 40 are connected to each other. In the modification, the electrode terminal of the energy storage device is a welding terminal that does not include the bolt but is connected (joined) to the bus bar by welding.

Figure 11:
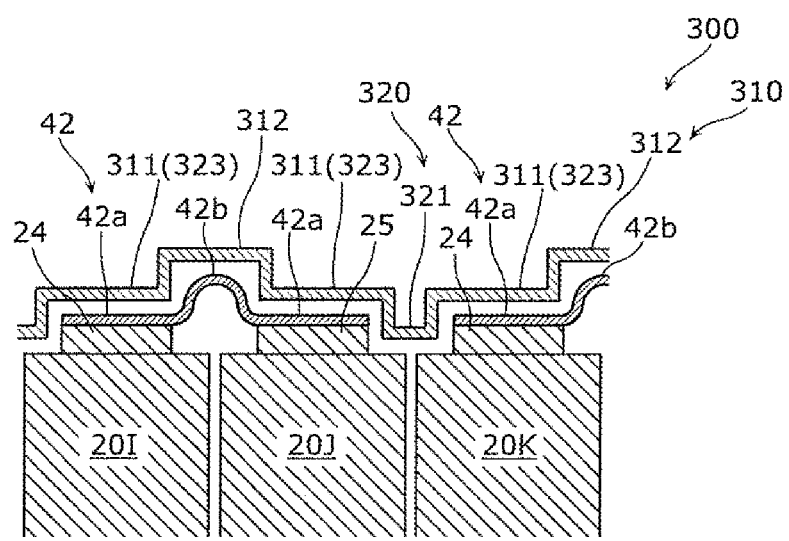
FIG. 11 is a sectional view illustrating a configuration of a lid of an energy storage apparatus according to a modification of the embodiment and the periphery of the lid.
Figure 12:
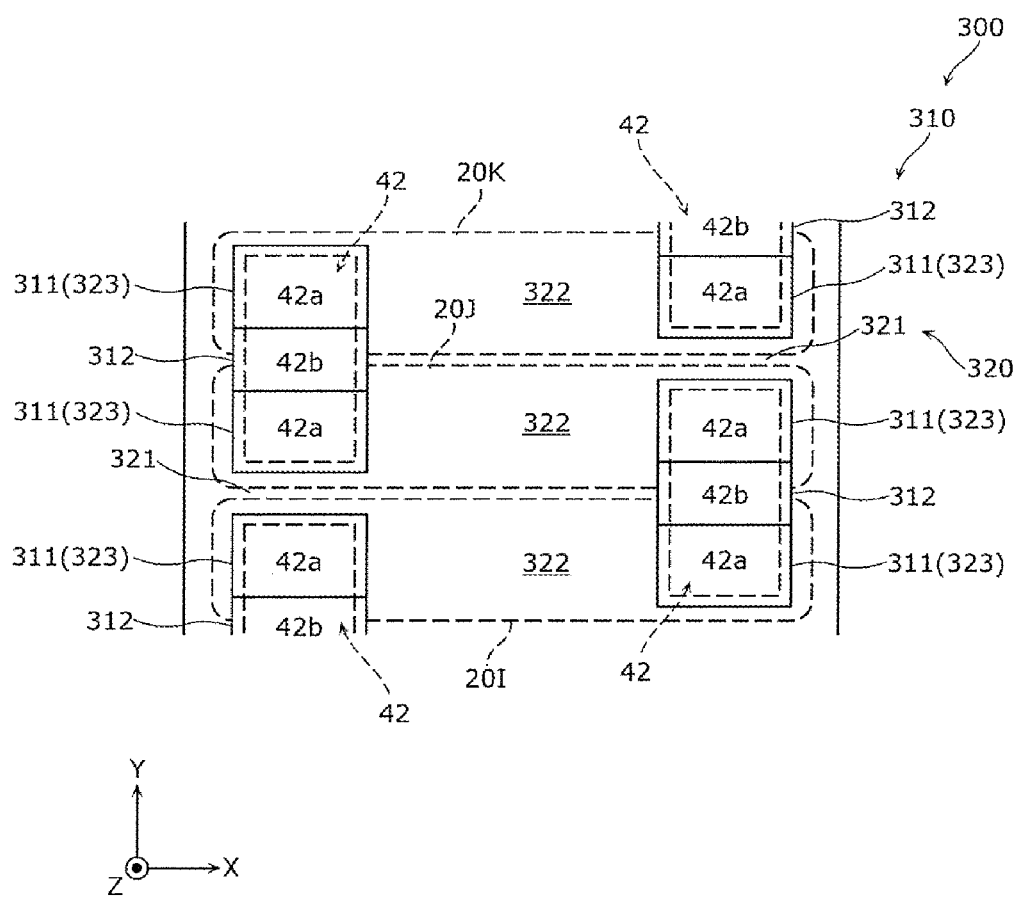
FIG. 12 is a plan view illustrating the configuration of the energy storage apparatus according to the modification of the embodiment.

FIG. 11 is a sectional view illustrating a configuration of a lid 300 of an energy storage apparatus according to the modification of the embodiment and the periphery of the lid 300. FIG. 12 is a plan view illustrating the configuration of the energy storage apparatus according to the modification of the embodiment. FIG. 11 is a view corresponding to a part of FIG. 8, and FIG. 12 is a view corresponding to a part of FIG. 9.

As illustrated in FIGS. 11 and 12, in the energy storage device 20 (in FIGS. 11 and 12, energy storage devices 20I to 20K) of the modification, the positive electrode terminal 22 and the negative electrode terminal 23 of the energy storage device 20 of the embodiment are replaced with a positive electrode terminal 24 and a negative electrode terminal 25. The bus bar 42 of the modification includes a terminal connection portion 42*a* and a middle portion 42*b*.

The positive electrode terminal 24 and the negative electrode terminal 25 are a welding terminal connected (joined) to the bus bar 42 by welding. Specifically, the positive electrode terminal 24 and the negative electrode terminal 25 are joined to the terminal connection portion 42*a* of the bus bar 42 by the welding. For example, the positive electrode terminal 24 of the energy storage device 20I is welded and joined to one of the terminal connection portions 42*a* of the bus bar 42, and the negative electrode terminal 25 of the energy storage device 20J is welded and joined to the other terminal connection portion 42*a* of the bus bar 42.

That is, the terminal connection portion 42*a* is a location connected to the electrode terminal of the energy storage device 20 in the bus bar 42, and two terminal connection portions 42*a* connected to the electrode terminals of two different energy storage devices 20 are disposed with respect to one bus bar 42. The middle portion 42*b* is a location disposed between the two terminal connection portions 42*a*. The middle portion 42*b* is a curved portion (hinge) that is provided such that the bus bar 42 can expand and contract in the Y-axis direction and the Z-axis direction, and the middle portion 42*b* is provided to protrude from the two terminal connection portions 42*a* onto the positive side in the Z-axis direction.

The lid 300 of the modification includes a protrusion 310 and a recess 320 instead of the protrusion 110 and the recess 120 (the irregularity structure formed in order to accommodate the plurality of bolt terminals) of the lid 100 of the embodiment. That is, the protrusion 310 is a protrusion disposed opposite to the bus bar 42, an outer surface of the protrusion being protruded, and the recess 320 is a recess disposed adjacent to the protrusion 310, an outer surface of the recess being recessed.

The protrusion 310 includes a first protrusion 311 disposed opposite to the electrode terminal of the energy storage device 20 (in FIGS. 11 and 12, the positive electrode terminals 24 and the negative electrode terminals 25 of the energy storage devices 20I to 20K). That is, the first protrusion 311 is disposed opposite to the terminal connection portion 42*a* of the bus bar 42. Specifically, the first protrusion 311 is disposed so as to cover the electrode terminal of the energy storage device 20 and the upper portion (the positive side in the Z-axis direction) of the terminal connection portion 42a, and the first protrusion 311 has a shape (in FIG. 12, a rectangular shape) corresponding to the electrode terminal and the terminal connection portion 42a in planar view (when viewed from the Z-axis direction). The first protrusion 311 is disposed while protruding relative to a first recess 321 and a second recess 322 (to be described later) of the recess 320.

The protrusion 310 includes a second protrusion 312 disposed opposite to the middle portion 42b of the bus bar 42. Specifically, the second protrusion 312 is disposed so as to cover the upper portion (the positive side in the Z-axis direction) of the middle portion 42b, and the second protrusion 312 has a shape (in FIG. 12, a rectangular shape) corresponding to the middle portion 42b in planar view (when viewed from the Z-axis direction). The second protrusion 312 is formed while protruding relative to the first protrusion 311.

The recess 320 includes the first recess 321 that is disposed between two first protrusions 311 disposed opposite to the electrode terminals of the two different energy storage devices 20 (for example, the negative electrode terminal 25 of the energy storage device 20J and the positive electrode terminal 24 of the energy storage device 20K). Specifically, the first recess 321 is disposed opposite to the lid portion of the case 21 of the energy storage device 20 between the two bus bars 42 adjacent to each other, and has a shape (in FIG. 12, a rectangular shape) corresponding to the space between the two bus bars 42 in planar view (when viewed from the Z-axis direction). The first recess 321 has the same configuration as the first recesses 121 to 126 of the embodiment.

The recess 320 includes the second recess 322 that is disposed between two first protrusions 311 disposed opposite to the two electrode terminals of the identical energy storage device 20 (for example, the positive electrode terminal 24 and the negative electrode terminal 25 of the energy storage device 20I). The second recess 322 has the same configuration as the second recesses 127 to 129 of the embodiment.

The recess 320 also includes a third recess 323 that is disposed opposite to at least one of the two terminal connection portions 42a and recessed relative to the second protrusion 312. In the modification, the third recess 323 is the first protrusion 311. That is, the first protrusion 311 is a protrusion relative to the first recess 321 and the second recess 322, but is a recess relative to the second protrusion 312, so that it can be said that the first protrusion 311 is the third recess 323.

In the above configuration, the conductive member 12 is disposed in the recess 320 as described in FIG. 9. That is, the conductive member 12 is disposed in any one of the first recess 321, the second recess 322, and the third recess 323.

For example, in the case that the conductive member 12 is disposed while extending in the X-axis direction (in the case of the second conductive member 12B or the third conductive member 12C in FIG. 9), the conductive member 12 interferes with the second protrusion 312 when the conductive member 12 is disposed in the first recess 321 to extend in the X-axis direction.

Specifically, the conductive member 12 can be disposed in a groove portion formed by the first recess 321 and the second recess 322 that are disposed opposite to each other between the negative electrode terminal 25 of the energy storage device 20J and the positive electrode terminal 24 of the energy storage device 20K. However, for the conductive member 12 (the second conductive member 12B and the third conductive member 12C in FIG. 9) disposed so as to extend straight in the X-axis direction across the adjacent energy storage units 10, the second protrusion 312 and the conductive member 12 that are disposed opposite to each other between the positive electrode terminal 24 of the energy storage device 20J and the negative electrode terminal 25 of the energy storage device 20K are arranged so as to overlap each other in the Z-axis direction. For this reason, the size in the height direction of the entire unit becomes large.

In such cases, the conductive member 12 can be disposed in parallel to the X-axis direction by disposing the conductive member 12 in the third recess 323 (and the second recess 322) on both the sides in the X-axis direction. As illustrated in FIG. 9, when the conductive member 12 is connected to the first connector 85, the conductive member 12 can also be disposed in the first recess 321. For example, the first conductive member 12A in FIG. 9 can be disposed in the first recess 321 without any problem.

For the second conductive member 12B and the third conductive member 12C in FIG. 9, the following method can be adopted as another solution to the problem of the interference in the Z-axis direction. That is, the conductive member 12 may be bent in the second recess 322 or between the adjacent energy storage units 10, and the conductive member 12 may be disposed in the first recess 321 while avoiding the second protrusion 312.

Because other configurations of the modification are the same as those of the embodiment, the detailed description will be omitted.

As described above, the same effects as those of the above embodiment can be obtained in the energy storage apparatus of the modification. In particular, the outer case (lid 300) of the energy storage unit includes the second protrusion 312 disposed opposite to the middle portion 42b of the bus bar 42. That is, in the case that the middle portion 42b of the bus bar 42 protrudes outward, when the outer case is formed along the middle portion 42b, the second protrusion 312 is formed at a position opposed to the middle portion 42b of the outer case, and the recess 320 is formed at a position adjacent to the second protrusion 312. Consequently, by disposing the conductive member such as the external wiring connected to the energy storage unit in the recess 320, the space in the recess 320 can effectively be used to secure the safety, the space saving can be achieved.

The outer case (lid 300) of the energy storage unit includes the third recess 323 that is disposed opposite to the terminal connection portion 42a of the bus bar 42. That is, because the terminal connection portion 42a of the bus bar 42 is recessed relative to the middle portion 42b, the third recess 323 opposed to the terminal connection portion 42a is formed when the outer case is formed along the bus bar 42. Consequently, by disposing the conductive member such as the external wiring connected to the energy storage unit in the third recess 323, the space in the third recess 323 can effectively be used to secure the safety, the space saving can be achieved.

In the bus bar 42, the middle portion 42b is the curved location that is provided while protruding from the terminal connection portion 42a onto the positive side in the Z-axial direction. However, even if the middle portion 42b has a flat plate shape or the like that is not the curved shape, the lid 300 includes the protrusion as in the above configuration when a connection portion to the harness or the like used to measure the voltage or the temperature protrudes from the terminal connection portion 42a by connecting the harness or the like to the middle portion 42b. In this case, the same thing as the above-mentioned modification can be said, and the same effect as the modification can be obtained.

Although the energy storage apparatus (energy storage unit) 10 and the electrical storage apparatus (battery pack) 1 of the embodiment and its modification of the present invention are described above, the present invention is not limited to the above embodiment and its modification. That is, it should be understood that the embodiment disclosed this time and the modification thereof are illustrative in all points and not restrictive. The scope of the present invention is illustrated by not the above description, but the scope of the claims, and is intended to include all changes within the scope of the claims and meaning equivalent to the scope of the claims.

In the embodiment, the battery module including the plurality of energy storage devices 20 is exemplified as the energy storage apparatus (energy storage unit) 10, and the energy storage apparatus (battery pack) 1 includes the plurality of battery modules. Alternatively, the battery pack including the plurality of battery modules may be used as the energy storage apparatus (energy storage unit) 10, and the energy storage apparatus 1 may include the plurality of battery packs. The same applies to the modification (the same applies to the following).

In the embodiment, the energy storage apparatus 10 includes the harness plate 50 as the wiring holding member, but the wiring holding member is not necessarily a member generally recognized as a "plate". The wiring holding member may be a member having a frame structure holding the internal wiring 65, the first connector 85, and the second connector 86.

The member electrically connected to the second connector 86 through the second wiring 65b is not necessarily the thermistor 63. An electrical component, such as a liquid leakage sensor that detects liquid leakage from the energy storage device 20, in which the voltage applied through the second wiring 65b is smaller than a rated voltage of the energy storage apparatus 10, the electrical component being different from the thermistor 63, may be connected to the second wiring 65b. An electric device connected by at least one electric wire as the second wiring 65b, the electric device transmitting a signal indicating the state of the energy storage apparatus 10 to an external control device through at least one electric wire and the second connector 86, may be connected to at least the one electric wire.

The number of members, such as a thermistor, which is electrically connected to the second connector 86 through the second wiring 65b in the energy storage apparatus 10 is not limited to "two". The number of the members may be at least one. Different kinds of members (for example, each of the thermistor and the liquid leakage sensor) may be electrically connected to the second connector 86 through the second wiring 65b.

Although each of the first connector 85 and the second connector 86 includes the plurality of pins for connection to the external wiring, the shape and the kind of each of the first connector 85 and the second connector 86 are not particularly limited. The first connector 85 or the second connector 86 may include a plurality of pin holes into which a plurality of pins of the connector at the end of the external wiring are inserted.

The energy storage device 20 of the energy storage apparatus 10 does not necessarily have the prismatic shape. The shape of the energy storage device 20 may be a circle, an ellipse, an oval, a polygon other than the rectangle, or a combination of a curve and a straight line in planar view. In any case, the effects such as the improvement of the safety by the harness plate 50 of the embodiment are obtained.

In the embodiment, the detection terminal 80 and the electrode terminal or the bus bar 40 are joined together by fastening with the nut. The method for joining the detection terminal 80 and the electrode terminal or the bus bar 40 is not limited to fastening by the nut, and the detection terminal 80 and the electrode terminal or the bus bar 40 may be joined by welding.

In the embodiment, the recess 120 formed in the lid 100 is formed between the two protrusions 110. Alternatively, the recess (the outer surface of the lid 100 recessed stepwise) adjacent to one protrusion 110 may be used as the recess 120.

Although the conductive member 12 is the external wiring in the above embodiment, the conductive member 12 may be a conductive member except for the external wiring. A substrate, a fuse, a relay, a thermistor, other electric components, or the like may be used as the conductive member 12.

In the embodiment, the conductive member 12 is disposed at the position in FIG. 9. Alternatively, each conductive member 12 may be disposed in any one of the recesses 120 of the lid 100 of the energy storage unit 10.

In the embodiment, the holders 113a, 114a are provided in the lids 100, and the harness cover 210 is disposed. Alternatively, the harness cover 210 may be disposed without providing the holders 113a, 114a in the lid 100, or the harness cover 210 may not be disposed.

In the embodiment, the energy storage unit 10 includes the first connector 85 including the connection port 85a that is open toward the recess 120 in the central portion of the lid 100, and the external wiring is connected to the first connector 85. Alternatively, the first connector 85 may be disposed at any position of the lid 100, and the connection port 85a of the first connector 85 may be open in any direction. The energy storage unit 10 may not include the first connector 85, but a wire or the like extending from the opening 100a may be disposed in the recess 120.

In the embodiment, the rib 130 abutting on the harness plate 50 and the rib 131 that abuts on the detection terminal 80 and closes a part of the opening 31 near the thermistor 63 are provided in the lid 100.

Alternatively, the rib 130 may not abut on the harness plate 50, the rib 131 may not abut on the detection terminal 80, or the rib 130 may cover the entire opening 31. The lid 100 may have a configuration in which the ribs 130, 131 are not provided. The harness plate 50 and the thermistor 63 may not be disposed.

A form constructed by any combination of the embodiment and the modification is also included in the scope of the present invention.

The present invention can be implemented as not only the energy storage apparatus, but also the wiring holding member (in the embodiment, the harness plate 50) or the outer case (lids 100, 300) provided in the energy storage apparatus.

INDUSTRIAL APPLICABILITY

The present invention can be applied to the energy storage apparatus including the energy storage device such as a lithium ion secondary battery.

DESCRIPTION OF REFERENCE SIGNS

1: energy storage apparatus (battery pack)
10: energy storage apparatus (energy storage unit)

10A: first energy storage unit
10B: second energy storage unit
10C: third energy storage unit
10D: fourth energy storage unit
10E: fifth energy storage unit
11: outer case
12, 13: conductive member
12A: first conductive member
12B: second conductive member
12C: third conductive member
20, 20A to 20K: energy storage device
22, 24: positive electrode terminal
23, 25: negative electrode terminal
31: opening
40, 42: bus bar
42a: terminal connection portion
42b: middle portion
50: harness plate
51: first restricting portion
52: second restricting portion
54: wall
56a: first region
56b: second region
63: thermistor
65: internal wiring
65a: first wiring
65b: second wiring
85: first connector
85a, 86a: connection port
86: second connector
100, 300: lid
101, 102, 110 to 118, 310: protrusion
105: low surface portion
113a, 114a: holder
120, 320: recess
121 to 126, 321: first recess
127 to 129, 322: second recess
130, 131: rib
311: first protrusion
312: second protrusion
323: third recess

The invention claimed is:

1. An energy storage apparatus comprising:
an energy storage device;
a first wiring electrically connected to the energy storage device;
a wiring holding member holding the first wiring; and
a first connector connected to the first wiring, the first connector being located in a central portion of the wiring holding member and being capable of detachably attaching an external wiring,
wherein the first wiring connects the energy storage device and the first connector.

2. The energy storage apparatus according to claim 1, further comprising:
a second wiring that includes a wiring for a voltage lower than that of the first wiring, and is held by the wiring holding member; and
a second connector connected to the second wiring and located at an end of the wiring holding member.

3. The energy storage apparatus according to claim 2, wherein the wiring holding member includes a restricting portion that restricts the first and second wirings to positions arranged in a first region in a direction intersecting with an arrangement direction of the energy storage device and the wiring holding member.

4. The energy storage apparatus according to claim 3, further comprising an outer case covering the wiring holding member from an opposite side to the energy storage device,
wherein a surface portion forming an outer surface closer to the wiring holding member than other portions is formed in the outer case at a position opposed to the first region.

5. The energy storage apparatus according to claim 2, wherein
the first and second wirings are disposed to detour around a second region on a connection port side of the first connector.

6. The energy storage apparatus according to claim 5, wherein the wiring holding member includes a wall standing along at least a part of a periphery of the second region.

7. The energy storage apparatus according to claim 1, further comprising:
a first energy storage unit including the energy storage device, a bus bar connected to an electrode terminal of the energy storage device, and an outer case; and
a first conductive member that includes the external wiring connected to the first energy storage unit,
wherein the outer case includes:
a protrusion that is disposed opposite to the bus bar, an outer surface of the protrusion being protruded; and
a recess disposed adjacent to the protrusion, an outer surface of the recess being recessed; and
wherein the first conductive member is disposed in the recess.

8. The energy storage apparatus according to claim 7, wherein the protrusion includes a first protrusion that is disposed opposite to the electrode terminal of the energy storage device.

9. The energy storage apparatus according to claim 8, wherein the recess includes a first recess disposed between two of the first protrusions that are disposed opposite to electrode terminals of two different energy storage devices.

10. The energy storage apparatus according to claim 8, wherein the recess includes a second recess disposed between two of the first protrusions that are disposed opposite to two electrode terminals of an identical energy storage device.

11. The energy storage apparatus according to claim 7, wherein the bus bar includes:
two terminal connection portions connected to the electrode terminals of the two different energy storage devices; and
a middle portion disposed between the two terminal connection portions, and
wherein the protrusion includes a second protrusion disposed opposite to the middle portion.

12. The energy storage apparatus according to claim 11, wherein the recess includes a third recess that is disposed opposite to at least one of the two terminal connection portions, the third recess being recessed relative to the second protrusion.

13. The energy storage apparatus according to claim 7, wherein a connection port, to which the external wiring of the first connector is connected, is disposed to be open toward a direction along a bottom surface of the recess and inward the recess.

14. The energy storage apparatus according to claim 13, wherein the first connector is disposed in a central portion of the outer case.

15. The energy storage apparatus according to claim 7, wherein the outer case includes a holder holding the first conductive member in the recess.

16. The energy storage apparatus according to claim 7, further comprising:
- a second energy storage unit different from the first energy storage unit; and
- a second conductive member connected to the second energy storage unit,
- wherein the second conductive member is disposed in the recess of the first energy storage unit.

17. The energy storage apparatus according to claim 7, wherein the outer case includes a rib opposed to the wiring holding member in a portion where the recess is not formed.

18. The energy storage apparatus according to claim 17, wherein the first energy storage unit further includes a thermistor, and
- wherein the rib is disposed at a position closing an opening adjacent to the thermistor.

19. An energy storage apparatus comprising:
- a first energy storage unit including an energy storage device, a bus bar connected to an electrode terminal of the energy storage device, and an outer case; and
- a first conductive member connected to the first energy storage unit,
- wherein the electrode terminal protrudes in a first direction,
- wherein the outer case includes:
  - a protrusion disposed opposite to the bus bar in the first direction, an outer surface of the protrusion being protruded; and
  - a recess disposed adjacent to the protrusion, an outer surface of the recess being recessed, and
- wherein the first conductive member is disposed in the recess.

20. The energy storage apparatus according to claim 19, further comprising a first electrode terminal and a second electrode terminal which protrude in the first direction,
- wherein the recess is disposed between the first terminal and the second terminal.

\* \* \* \* \*